(12) United States Patent
Kato et al.

(10) Patent No.: US 8,428,434 B2
(45) Date of Patent: Apr. 23, 2013

(54) VIDEO REPRODUCING APPARATUS, VIDEO DISPLAY SYSTEM AND RECORD MEDIUM

(75) Inventors: Masahiro Kato, Tokorozawa (JP); Toshio Suzuki, Tokyo (JP); Eiji Muramatsu, Tokyo (JP); Shoji Taniguchi, Tokorozawa (JP); Takao Sawabe, Tokyo (JP); Kazuo Kuroda, Yokohama (JP); Akira Imamura, Sayama (JP)

(73) Assignee: Pioneer Corporation, Tokyo (JP)

( * ) Notice: Subject to any disclaimer, the term of this patent is extended or adjusted under 35 U.S.C. 154(b) by 898 days.

(21) Appl. No.: 12/446,655

(22) PCT Filed: Oct. 23, 2006

(86) PCT No.: PCT/JP2006/321051
§ 371 (c)(1),
(2), (4) Date: Apr. 22, 2009

(87) PCT Pub. No.: WO2008/050383
PCT Pub. Date: May 2, 2008

(65) Prior Publication Data
US 2010/0034519 A1 Feb. 11, 2010

(51) Int. Cl.
*H04N 5/90* (2006.01)
(52) U.S. Cl.
USPC ............ 386/248; 386/341; 386/E5.001
(58) Field of Classification Search ............ 386/248, 386/341, E5.001
See application file for complete search history.

(56) References Cited

U.S. PATENT DOCUMENTS

| | | | | |
|---|---|---|---|---|
| 6,549,720 | B1 * | 4/2003 | Yamada et al. | 386/248 |
| 6,728,477 | B1 * | 4/2004 | Watkins | 386/354 |
| 7,848,214 | B2 * | 12/2010 | Kanegae et al. | 369/275.1 |
| 2001/0048481 | A1 * | 12/2001 | Hatano et al. | 348/473 |
| 2003/0108341 | A1 | 6/2003 | Oshima et al. | |
| 2003/0118192 | A1 | 6/2003 | Sasaki | |

FOREIGN PATENT DOCUMENTS

| | | |
|---|---|---|
| JP | 11-150706 | 6/1999 |
| JP | 2002-199500 | 7/2002 |
| JP | 2004-213486 | 7/2004 |
| JP | 2005-191826 | 7/2005 |
| JP | 2006-042134 | 2/2006 |

* cited by examiner

*Primary Examiner* — Thai Tran
*Assistant Examiner* — Girumsew Wendmagegn
(74) *Attorney, Agent, or Firm* — Young & Thompson

(57) ABSTRACT

Provided herein are: a data acquiring unit which acquires a plurality of angle video data equal or less than the angle video data and relative display position information from a recording unit which records the plurality of angle video data corresponding to the plurality of angle videos taken at a plurality of taking angles different from one another in which a taken object is taken and records the relative display position information indicating a relative display position of each angle video in consideration of each taking angle; a video signal output unit which outputs a plurality of angle video signals corresponding to the plurality of angle videos to display units based on the plurality of angle video data; and an arrangement determining unit which determines a display position arrangement of the plurality of angle videos based on the relative display position information.

12 Claims, 20 Drawing Sheets

F I G. 3

| REFERENCE VIDEO | RELATIVE DISPLAY POSITION INFORMATION WITH RESPECT TO REFERENCE VIDEO | | | | | | | | | | | |
|---|---|---|---|---|---|---|---|---|---|---|---|---|
| | VIDEO 1 | VIDEO 2 | VIDEO 3 | VIDEO 4 | VIDEO 5 | VIDEO 6 | VIDEO 7 | VIDEO 8 | VIDEO 9 | VIDEO 10 | VIDEO 11 | VIDEO 12 |
| VIDEO 1 | | (-1, 0) | (-2, 0) | (-3, 0) | (0, 0) | (+7, 0) | (+6, 0) | (+5, 0) | (+4, 0) | (+3, 0) | (+2, 0) | (+1, 0) |
| VIDEO 2 | (+1, 0) | | (-1, 0) | (-2, 0) | (-3, 0) | (-4, 0) | (-5, 0) | (0, 0) | (+5, 0) | (+4, 0) | (+3, 0) | (+2, 0) |
| VIDEO 3 | (+2, 0) | (+1, 0) | | (-1, 0) | (-2, 0) | (-3, 0) | (-4, 0) | (-5, 0) | (0, 0) | (+5, 0) | (+4, 0) | (+3, 0) |
| VIDEO 4 | (+3, 0) | (+2, 0) | (+1, 0) | | (-1, 0) | (-2, 0) | (-3, 0) | (-4, 0) | (-5, 0) | (0, 0) | (+5, 0) | (+4, 0) |
| VIDEO 5 | (0, 0) | (+3, 0) | (+2, 0) | (+1, 0) | | (-1, 0) | (-2, 0) | (-3, 0) | (-4, 0) | (-5, 0) | (-6, 0) | (-7, 0) |
| VIDEO 6 | (+5, 0) | (+4, 0) | (+3, 0) | (+2, 0) | (+1, 0) | | (-1, 0) | (-2, 0) | (-3, 0) | (-4, 0) | (-5, 0) | (0, 0) |
| VIDEO 7 | (+6, 0) | (+5, 0) | (+4, 0) | (+3, 0) | (+2, 0) | (+1, 0) | | (-1, 0) | (-2, 0) | (-3, 0) | (0, 0) | (+7, 0) |
| VIDEO 8 | (-5, 0) | (0, 0) | (+5, 0) | (+4, 0) | (+3, 0) | (+2, 0) | (+1, 0) | | (-1, +1) | (-2, +2) | (-3, 0) | (-4, 0) |
| VIDEO 9 | (-4, 0) | (-5, 0) | (0, 0) | (+5, 0) | (+4, 0) | (+3, 0) | (+2, 0) | (+1, -1) | | (-1, +1) | (-2, 0) | (-3, 0) |
| VIDEO 10 | (-3, 0) | (-4, 0) | (-5, 0) | (0, 0) | (+5, 0) | (+4, 0) | (+3, 0) | (+2, -2) | (+1, -1) | | (-1, 0) | (-2, 0) |
| VIDEO 11 | (-2, 0) | (-3, 0) | (-4, 0) | (-5, 0) | (-6, 0) | (-7, 0) | (0, 0) | (+3, 0) | (+2, 0) | (+1, 0) | | (-1, 0) |
| VIDEO 12 | (-1, 0) | (-2, 0) | (-3, 0) | (-4, 0) | (-5, 0) | (0, 0) | (+1, 0) | (+2, 0) | (+3, 0) | (+4, 0) | (+5, 0) | |

| ORDER | VIDEO 5 | VIDEO 6 | VIDEO 7 |
|---|---|---|---|
| VIDEO 5 |  | (−1, 0) | (−2, 0) |
| VIDEO 6 | (+1, 0) |  | (−1, 0) |
| VIDEO 7 | (+2, 0) | (+1, 0) |  |

| DISTANCE | VIDEO 5 | VIDEO 6 | VIDEO 7 |
|---|---|---|---|
| VIDEO 5 |  | (−8, 0) | (−13, 0) |
| VIDEO 6 | (+8, 0) |  | (−5, 0) |
| VIDEO 7 | (+13, 0) | (+5, 0) |  |

FIG. 5

| REFERENCE VIDEO | SELECTION ORDER INFORMATION WITH RESPECT TO REFERENCE VIDEO ||||||||||||
| | VIDEO 1 | VIDEO 2 | VIDEO 3 | VIDEO 4 | VIDEO 5 | VIDEO 6 | VIDEO 7 | VIDEO 8 | VIDEO 9 | VIDEO 10 | VIDEO 11 | VIDEO 12 |
|---|---|---|---|---|---|---|---|---|---|---|---|---|
| VIDEO 1 |  | 2 | 3 | 0 | 0 | 0 | 0 | 0 | 0 | 0 | 2 | 1 |
| VIDEO 2 | 1 |  | 1 | 2 | 0 | 0 | 0 | 0 | 0 | 0 | 0 | 2 |
| VIDEO 3 | 2 | 1 |  | 1 | 2 | 0 | 0 | 0 | 0 | 0 | 0 | 0 |
| VIDEO 4 | 0 | 2 | 3 |  | 1 | 2 | 0 | 0 | 0 | 0 | 0 | 0 |
| VIDEO 5 | 0 | 0 | 3 | 2 |  | 1 | 2 | 0 | 0 | 0 | 0 | 0 |
| VIDEO 6 | 0 | 0 | 3 | 2 | 1 |  | 1 | 2 | 3 | 0 | 0 | 0 |
| VIDEO 7 | 0 | 0 | 0 | 0 | 2 | 1 |  | 1 | 3 | 0 | 0 | 0 |
| VIDEO 8 | 0 | 0 | 0 | 0 | 0 | 2 | 1 |  | 1 | 2 | 2 | 0 |
| VIDEO 9 | 0 | 0 | 0 | 0 | 0 | 0 | 2 | 1 |  | 1 | 1 | 0 |
| VIDEO 10 | 0 | 0 | 0 | 0 | 0 | 0 | 0 | 2 | 1 |  | 2 | 0 |
| VIDEO 11 | 2 | 0 | 0 | 0 | 0 | 0 | 0 | 0 | 3 | 2 |  | 2 |
| VIDEO 12 | 1 | 2 | 3 | 0 | 0 | 0 | 0 | 0 | 3 | 2 | 1 |  |

F I G. 7
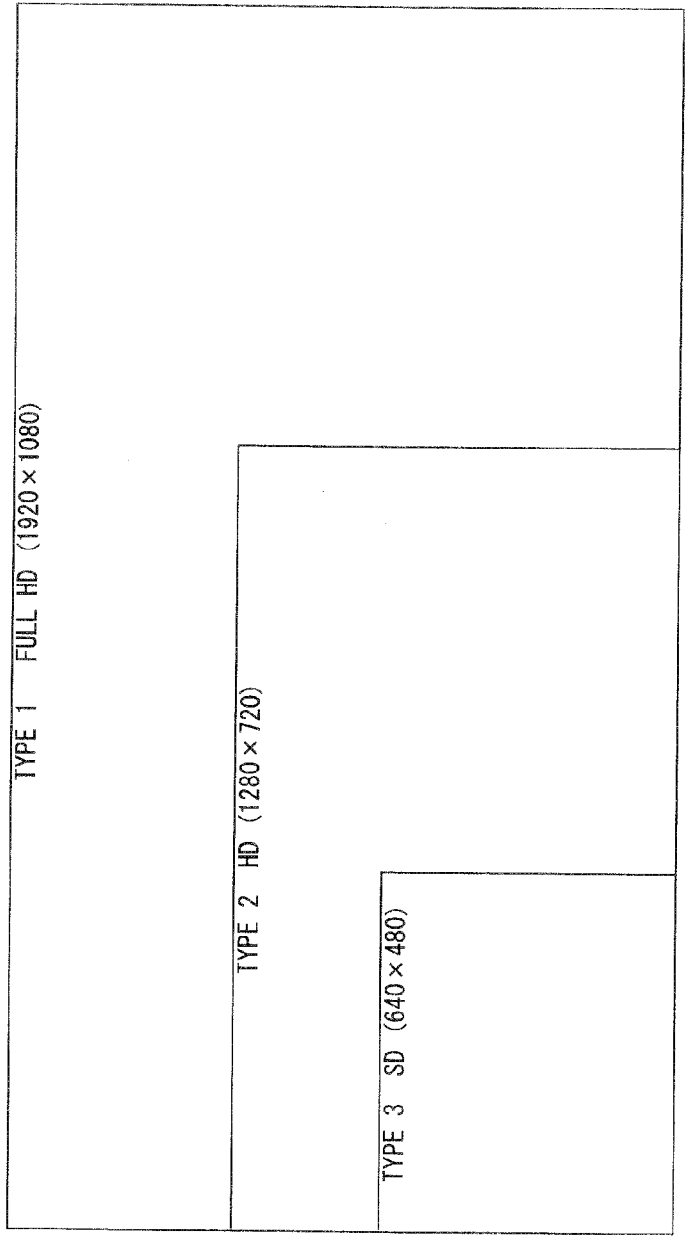
| | | VIDEO TYPE INFORMATION | | |
|---|---|---|---|---|
| | | TYPE 1 | TYPE 2 | TYPE 3 |
| VIDEO | VIDEO 1 | 1920×1080, MPEG2, 20Mbps | 1280×720, MPEG2, 14Mbps | 640×480, MPEG2, 8Mbps |
| | VIDEO 2 | 1920×1080, MPEG4, 10Mbps | 1280×720, MPEG2, 15Mbps | 640×480, MPEG2, 9Mbps |
| | VIDEO 3 | 1920×1080, MPEG2, 18Mbps | 1280×720, MPEG4, 10Mbps | 640×480, MPEG4, 5Mbps |
| | VIDEO 4 | 1920×1080, MPEG2, 14Mbps | — | 640×480, MPEG2, 8Mbps |
| | VIDEO 5 | 1920×1080, MPEG4, 9Mbps | 1280×720, MPEG4, 6Mbps | — |
| | VIDEO 6 | — | 1280×720, MPEG2, 9Mbps | 640×480, MPEG2, 7Mbps |
TYPE 1  FULL HD (1920×1080)
TYPE 2  HD (1280×720)
TYPE 3  SD (640×480)

FIG. 8

| TIME | OUTPUT 1 | OUTPUT 2 | OUTPUT 3 |
|---|---|---|---|
| 00:00:00 | VIDEO 9 | VIDEO 8 | VIDEO 7 |
| 00:10:25 | VIDEO 5 | VIDEO 4 | VIDEO 3 |
| 00:21:43 | VIDEO 9 | VIDEO 8 | VIDEO 7 |
| 00:33:02 | VIDEO 5 | VIDEO 4 | VIDEO 3 |
| . | . | . | . |
| . | . | . | . |
| . | . | . | . |

F I G. 9

| OVERLAY | START | END | OUTPUT NUMBER |
|---|---|---|---|
| DATA 1 | 00:10:25 | 00:10:36 | OUTPUT 2 |
| DATA 2 | 00:33:02 | 00:33:20 | OUTPUT 3 |
| DATA 3 | 00:39:27 | 00:41:46 | OUTPUT 3 |
| DATA 4 | 01:01:12 | 01:02:51 | OUTPUT 2 |
| . | . | . | . |
| . | . | . | . |
| . | . | . | . |

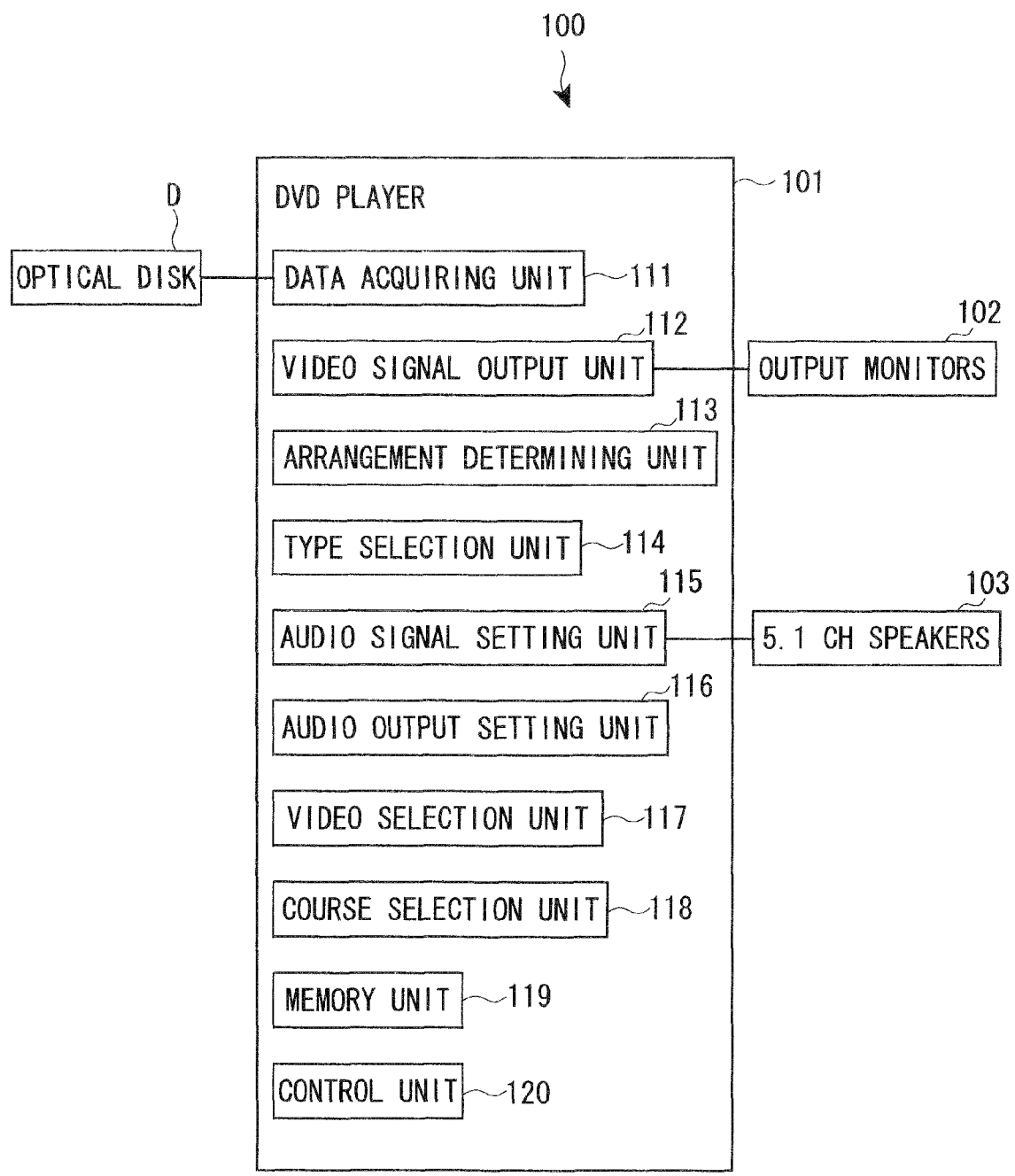
F I G. 1 1

F I G. 1 2
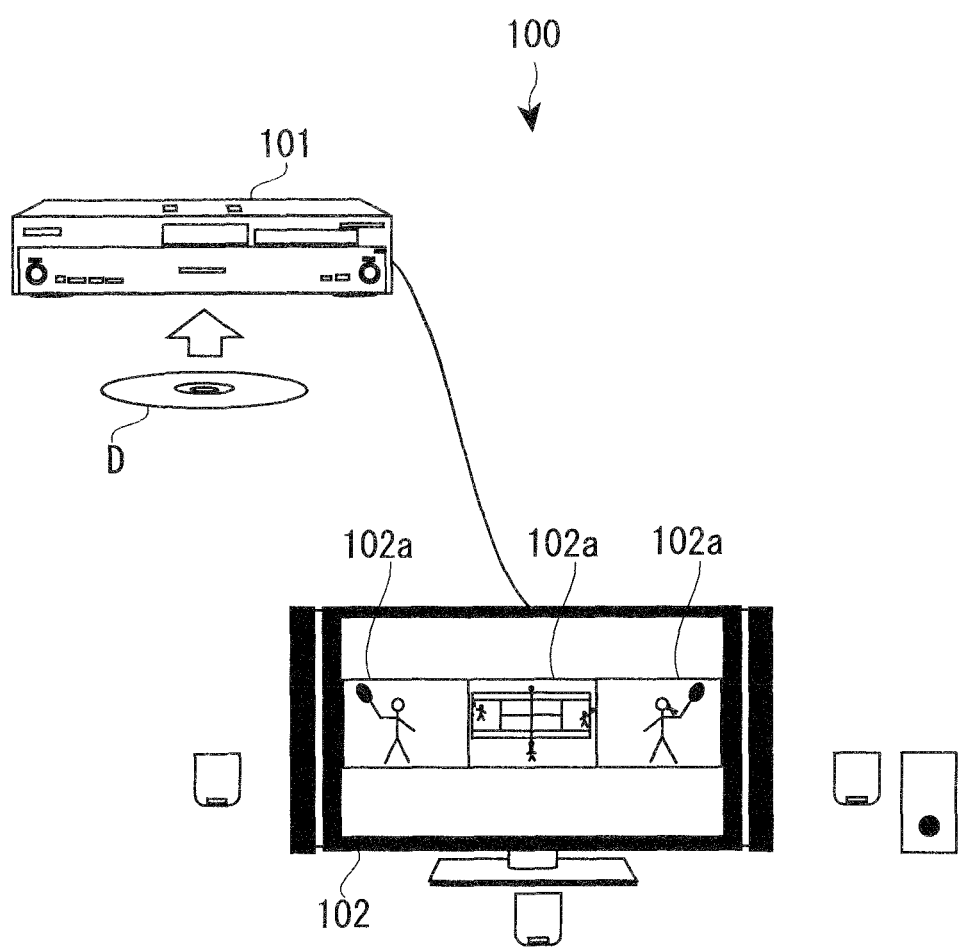

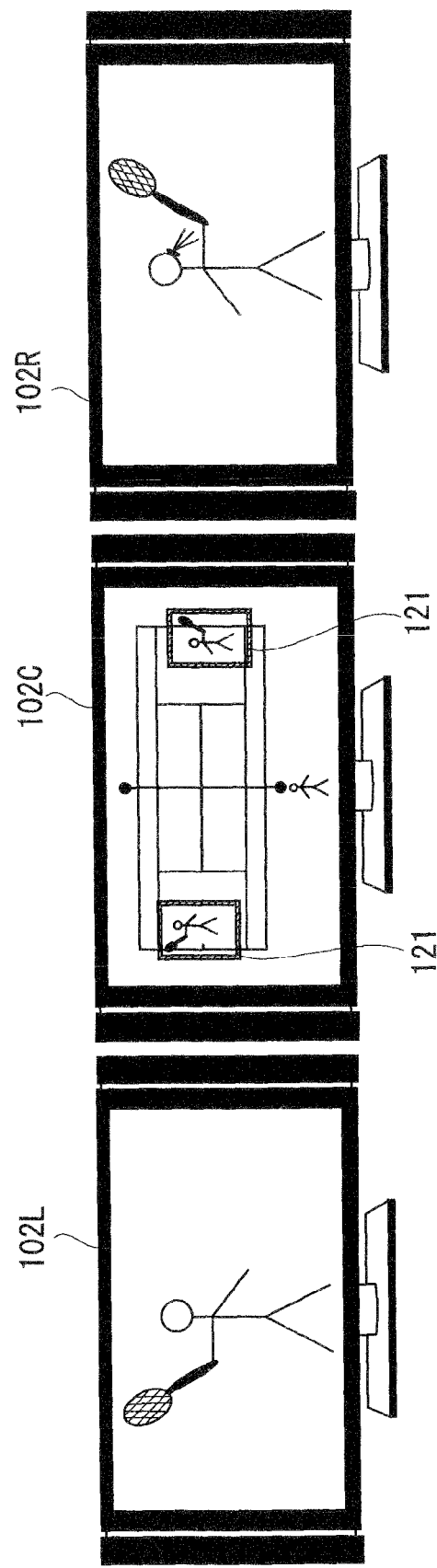

F I G. 1 6
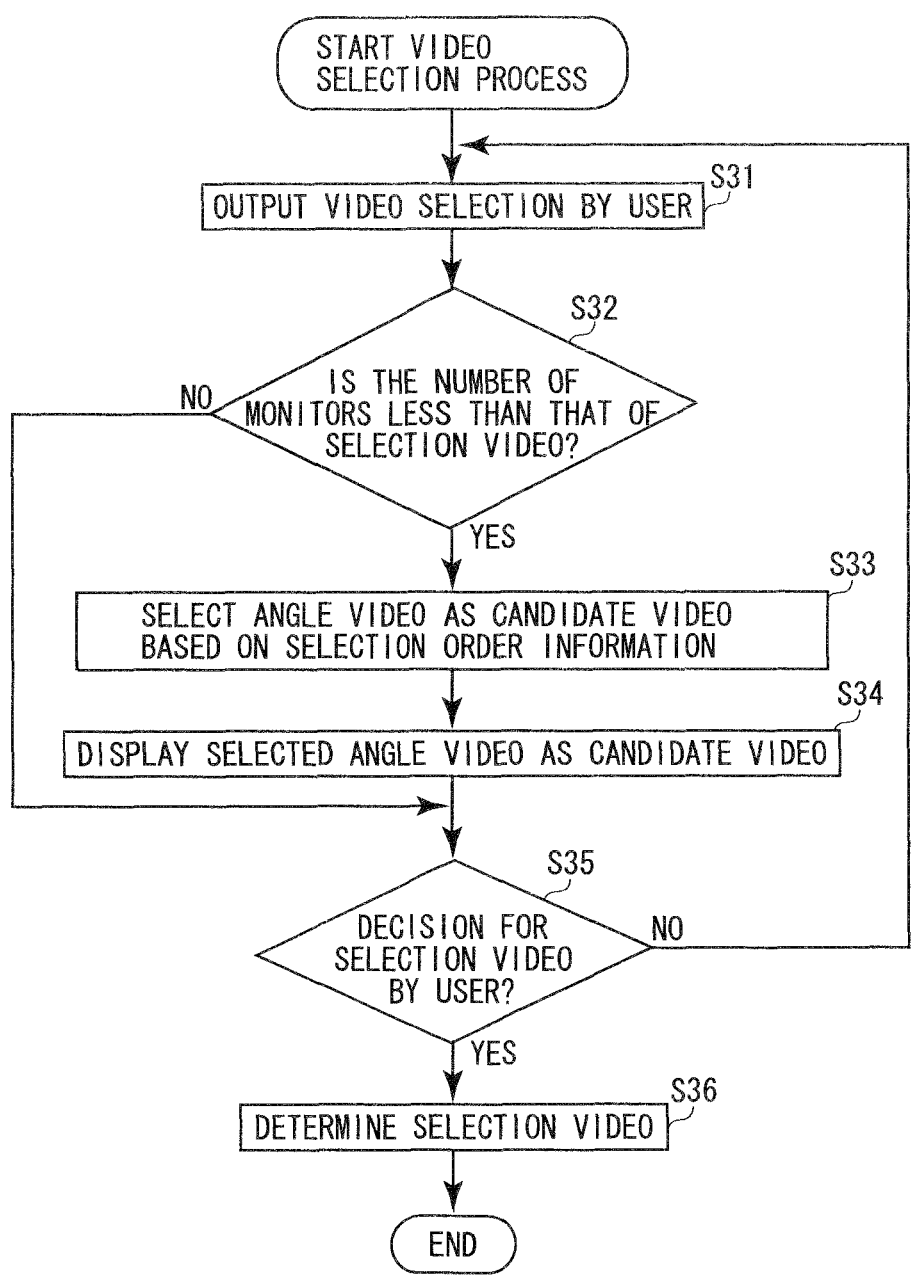

VIDEO REPRODUCING APPARATUS, VIDEO DISPLAY SYSTEM AND RECORD MEDIUM

TECHNICAL FIELD

The present invention relates to a video reproducing apparatus that reproduce, what is called, a plurality of multi-angle videos simultaneously, a video display system and a recording medium.

BACKGROUND ART

In recent years, there is known a video reproducing apparatus which reproduces a plurality of angle videos on a plurality of divided display areas in a screen of a display apparatus (TV) simultaneously with a recording device (DVD) having a plurality of recorded angle videos (multi-angle videos) taken from a plurality of different angles at which a taken object is taken (e.g., see Patent Document 1).
[Patent Document 1] JP-A-2001-223991

DISCLOSURE OF THE INVENTION

Problems to be Solved

However, the above video reproducing apparatus does not reproduce the plurality of angle videos to be reproduced simultaneously such that the angle videos are reproduced in consideration of a display position arrangement of each of taking angles of the angle videos. For example, in a case that three angle videos (an angle video 1, an angle video 2 and an angle video 3) recorded on a recording medium are reproduced simultaneously, the angle video 1 is reproduced on user's right display area, the angle video 2 is reproduced on user's central display area, and the angle video 3 is reproduced on user's left display area simply, regardless of the taking angle of each of the angle videos. In a case that the taken object recorded on the recording medium is a "tennis match", and in a case that the angle video 1 is a taken video in which a left player A seen from a chief referee is taken from the chief referee side, the angle video 2 is a taken video in which a right player B seen from the chief referee is taken from the chief referee side, and the angle video 3 is a taken video in which a whole court is taken from the chief referee side, the video of the player A is reproduced on the user's right display area, the video of the player B is reproduced on the user's center display area, and the video of the overall court is reproduced on the user's left display area. With such a display position arrangement of the plurality of angle videos, a user (a viewer) feels something strange, leading to a problem.

An object of the present invention is to provide a video reproducing apparatus that allows to reproduce a plurality of angle videos to be reproduced simultaneously with a display position arrangement in consideration of a taking angle of each of the angle videos, a video display system and a recording medium.

Means to Solve the Problems

A video reproducing apparatus of the invention has: a data acquiring unit which acquires a plurality of angle video data which is equal or less than an amount of the angle video data, relative display position information corresponding to the angle video data, and audio data from a recording unit which records the plurality of angle video data corresponding to a plurality of angle videos taken at a plurality of taking angles different from one another at which a taken object is taken, which records the relative display position information indicating a relative display position of each angle video in consideration of each taking angle, and which records the audio data corresponding to audios of a plurality of channels reproduced with the plurality of angle videos; a video signal output unit which outputs a plurality of angle video signals corresponding to the plurality of angle videos on a display unit based on the plurality of angle video data; an arrangement determining unit which determines display position arrangement of the plurality of angle videos based on the relative display position information; an audio signal output unit which outputs audio signals of the plurality of channels to speakers having a plurality of channels based on the audio data; and an audio output setting unit which sets the speakers to be output with the audio signal of each channel based on the relative display position information.

With this structure, the display position arrangement of the plurality of angle videos is determined based on the relative display position information which indicates a relative display position of each angle video in consideration of each taking angle. Consequently, the plurality of angle videos reproduced simultaneously can be reproduced in the display position arrangement in consideration of the taking angle of each angle video. Therefore, a user does not feel something strange, and moreover, can view the plurality of angle videos with realistic sensation.

With this structure, the audios of the plurality of channels are output to the speakers having the plurality of channels so as to coincide orientation of the plurality of angle videos reproduced simultaneously with the audios. Therefore, it is possible to form a sound field with realistic sensation.

For example, a hard disk and various semi-conductor memories can be used as recording unit as well as various optical disks of DVD or the like.

In this case, when a display unit has a plurality of display apparatuses, it is preferable that the video signal output unit output the plurality of angle video signals to the plurality of display apparatuses separately, and the arrangement determining unit set the display apparatuses to which each angle video signal is output based on arrangement information of the plurality of display apparatuses and the relative display position information.

With this structure, it is possible to display each angle video bigger by displaying the plurality of angle videos on the plurality of display apparatuses separately. The display position arrangement of the plurality of angle videos is determined further in consideration of an arrangement of the plurality of display apparatuses. Therefore, the plurality of angle videos reproduced on the plurality of display apparatuses can be reproduced in the display position arrangement in consideration of a taking angle for each angle video.

In this case, it is preferred that the recording unit record video type information composed of a plurality of video types having the different number of pixels per angle video, the data acquiring unit acquire the video type information, and the video reproducing apparatus further have a video type selection unit which selects a video type corresponding to screen resolution of the display unit on which the angle video is displayed from the plurality of video types of each of the angle videos based on the video type information.

With this structure, a video type of each angle video is selected so as to adjust each of the angle videos to an angle video having pixels corresponding to the screen resolution of a display apparatus on which each angle video is displayed. Consequently, the display apparatus reproduces the angle video having the optimum number of pixels for the screen resolution thereof. Therefore, it is possible to avoid image degradation by up convert or down convert, without necessity for resolution conversion adapted to the screen resolution of the display apparatus.

In this case, when only one display unit is provided, it is preferred that the video signal output unit synthesize the plurality of angle video signals to output to the display unit on which the plurality of angle videos are displayed on a divided plurality of display areas respectively in a screen display of the display unit based on the determined display position arrangement.

With this structure, it is possible to reproduce the plurality of angle videos on a single display apparatus even when the plurality of display apparatus can not be set because of a setting space or the number of apparatuses. It is possible to reproduce the plurality of angle videos reproduced simultaneously in a display position arrangement in consideration of the taking angle of each angle video in a single display unit.

Another video reproducing apparatus according to the invention includes: a data acquiring unit which acquires a plurality of angle video data which is equal or less than an amount of the angle video data, relative display position information corresponding to the angle video data, and selection order information from a recording unit which records the plurality of angle video data corresponding to a plurality of angle videos taken at a plurality of taking angles at which a taken object is taken from different angles one another, which records the relative display position information indicating a relative display position of each angle video in consideration of each taking angle, and which records the selection order information indicating which angle video among other plurality of angle videos should be reproduced simultaneously on a priority basis for each angle video in consideration of each taking angle; a video selection unit which allows a user to select the plurality of angle videos reproduced simultaneously among the plurality of angle videos on a selection screen; a video signal output unit which outputs a plurality of angle video signals corresponding to the selected plurality of angle videos to a display unit; and an arrangement determining unit which determines display position arrangement of the plurality of angle videos based on the relative display position information; the video selection unit displays a candidate video of a remaining angle video based on the selection order information of each of the selected angle videos when the user selects a part of the plurality of angle videos.

With this structure, the video selection unit selects an angle video which the user would like to view from angle videos which can be reproduced. Then, according to the selection, the data acquiring unit acquires a plurality of angle video data and the arrangement determining unit determines display position arrangement in terms of the selected plurality of angle videos. Therefore, it is possible to reproduce the plurality of angle videos selected by the user in the display position arrangement in consideration of the taking angle of each angle video.

Also, with this structure, a candidate video of the remaining angle video is displayed on the selection screen in consideration of the taking angle of each selected angle video. Therefore, it is possible to prompt to select a video as a remaining angle video on reproducing simultaneously without a sense of odd.

Another video reproducing apparatus according to the invention includes: a data acquiring unit which acquires a plurality of angle video data which is equal or less than an amount of the angle video data, relative display position information corresponding to the angle video data, and a sequence file from a recording unit which records the plurality of angle video data corresponding to a plurality of angle videos taken at a plurality of taking angles at which a taken object is taken from different angles one another, which records the relative display position information indicating a relative display position of each angle video in consideration of each taking angle, and which records the sequence file by which combinations of the plurality of angle videos reproduced simultaneously are switched sequentially during reproduction; a video signal output unit which outputs a plurality of angle video signals corresponding to the plurality of angle videos to a display unit based on the plurality of angle video data and the sequence file; and an arrangement determining unit which determines display position arrangement of the plurality of angle videos per combination of the plurality of angle videos switched sequentially based on the relative display position information and the sequence file.

With this structure, combinations of a plurality of angle videos are switched sequentially based on the sequence file during reproduction, and a plurality of angle videos are reproduced simultaneously. Consequently, combinations of the plurality of angle videos can be switched automatically during reproduction. Therefore, the user does not need to perform a switching operation and it will become more convenient to the user.

In this case, it is preferred that the recording unit record a plurality of sequence files, and the video reproducing apparatus further have a course selection unit which allows the user to select a video course among a plurality of video courses corresponding to the respective sequence files on the selection screen.

With this structure, a plurality of angle videos are reproduced simultaneously as the combinations of the plurality of angle videos are switched sequentially during reproduction based on a sequence file corresponding to a video course selected by the user. Therefore, the user can view the video course to the user's taste.

In this case, it is preferred that each of the sequence files include video data by course per video course, and the video signal output unit output the plurality of angle video signals so as to display the video by course based on the video data by course to superimpose on each angle video.

With this structure, it is possible to superimpose a video by course corresponding to each video course on each angle video.

In this case, it is preferred that each of the sequence files include audio data by course per video course, and the video reproducing apparatus further have an audio signal output unit which outputs an audio signal by course to speakers based on the audio data by course.

With this structure, it is possible to reproduce an audio by course corresponding to each video course, together with the reproduced plurality of angle videos.

In this case, it is preferred that the plurality of angle videos include a whole video in which the taken object is taken as a whole and a partial video in which a part of the taken object is taken, the video signal output unit output the plurality of angle video signals so as to indicate a taking spot for the partial video of the taken object in the whole video based on the relative display position information.

With this structure, it is possible for the user to acknowledge the taking spot for the partial video of the taken object in the whole video.

In this case, it is preferred that the recording unit record taking time information indicating taking time of each of the angle videos, the data acquiring unit acquire the taking time information from the recording unit, and the video signal output unit output the plurality of angle video signals based on the taking time information.

With this structure, it is possible to reproduce a plurality of angle videos which have different taking start time one another simultaneously by coinciding the taking time or offsetting a predetermined time. It is also possible to restart reproduction so as to coincide other angle videos and the taking time even if an angle video has time discontinuity during reproduction.

A video display system of the invention includes the video reproducing apparatus as set forth in appended Claim 1 and a display unit.

With this structure, it is possible to display a plurality of angle videos reproduced simultaneously in a display position arrangement in consideration of the taking angle of each angle video by having the above video reproducing apparatus.

A recording medium of the invention is a recording unit in which a plurality of angle video data and relative display position information are recorded which are acquired by the data acquiring unit provided in the video reproducing apparatus described in the appended Claim 1.

With this structure, it is possible to provide the plurality of angle video data and the relative display position information by which the plurality of angle videos reproduced simultaneously can be reproduced in the display position arrangement in consideration of the taking angle of each angle video by the above video reproducing apparatus.

BRIEF DESCRIPTION OF THE DRAWINGS

FIG. 3 is a relative display position information table.

FIG. 5 is a selection order information table.

FIG. 7 is a video type information table.

FIG. 8 is a video switching information table.

FIG. 9 is an overlay information table.

FIG. 10A shows an example of an overlay display in which a player A is focused on, FIG. 10B shows an example of an overlay display in which a player B is focused on, and FIG. 10C shows an example of an overlay display in which both players are focused on.

FIG. 11 is a block diagram of the video display system.

FIG. 12 shows a structure of the video display system having one output monitor.

FIG. 13 shows a display example of taking spot display frames in a whole video.

FIG. 16 is a flow chart explaining a video selection process.

REFERENCE NUMERALS

Figure 1:
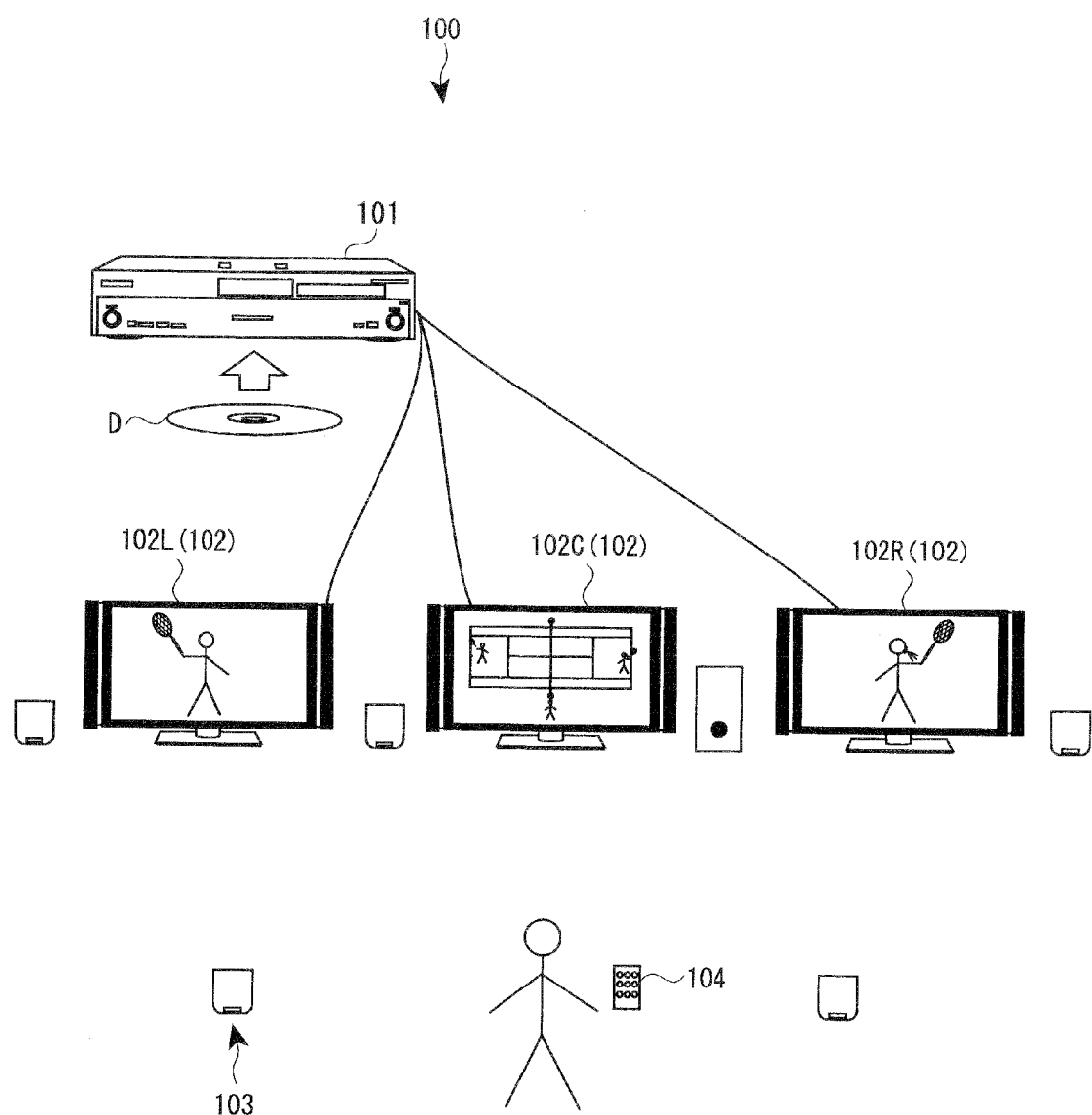
FIG. 1 shows a structure of a video display system having three output monitors.

100 video display system
101 DVD player
102 output monitor
102a display area
103 5.1 CH speakers
111 data acquiring unit
112 video signal output unit
113 arrangement determining unit
114 type selection unit
115 audio signal output unit
116 audio output setting unit
117 video selection unit
118 course selection unit
119 memory unit
120 control unit
122 video selection screen
124 candidate display frame
125 marking

BEST MODES FOR CARRYING OUT THE INVENTION

An embodiment of the invention will be explained hereinbelow with reference to accompanying drawings. A video display system according to the embodiment is to reproduce/display a plurality of multi-angle videos simultaneously recorded on a DVD.

As shown in FIG. 1, a video display system 100 includes a DVD player 101 (a video reproducing apparatus) which reproduces the DVD as an optical disk D (a recording unit), three output monitors 102 (a left monitor 102L, a center monitor 102C and a right monitor 102R) which are connected to the DVD player 101 and display a video recorded on the optical disk D, respectively, and 5.1 CH speakers 103 which are connected to the DVD player 101 and output an audio recorded on the optical disk D. For example, a remote controller 104 allows a user to operate such as reproduction. Screen resolution of each of the output monitors 102 is defined as; the left monitor 102L: HD (1280×720), the center monitor 102C: SD (640×480), the right monitor 102R: full HD (1920×1080).

The video display system 100 is adapted to output three angle video signals to the three output monitors 102 individually based on a plurality of angle video data read from the optical disk D and to display three angle videos simultaneously.

On the optical disk D, the plurality of angle video data, relative display position information, selection order information, taking time information and video type information of each angle video data, a plurality of sequence files having video switching information and the like, and 5.1 CH audio data are recorded. Each data/information will be described hereinbelow.

The plurality of angle video data correspond to a plurality of angle videos in which a taken object is taken at a plurality of taking angles different from one another.

Figure 2:
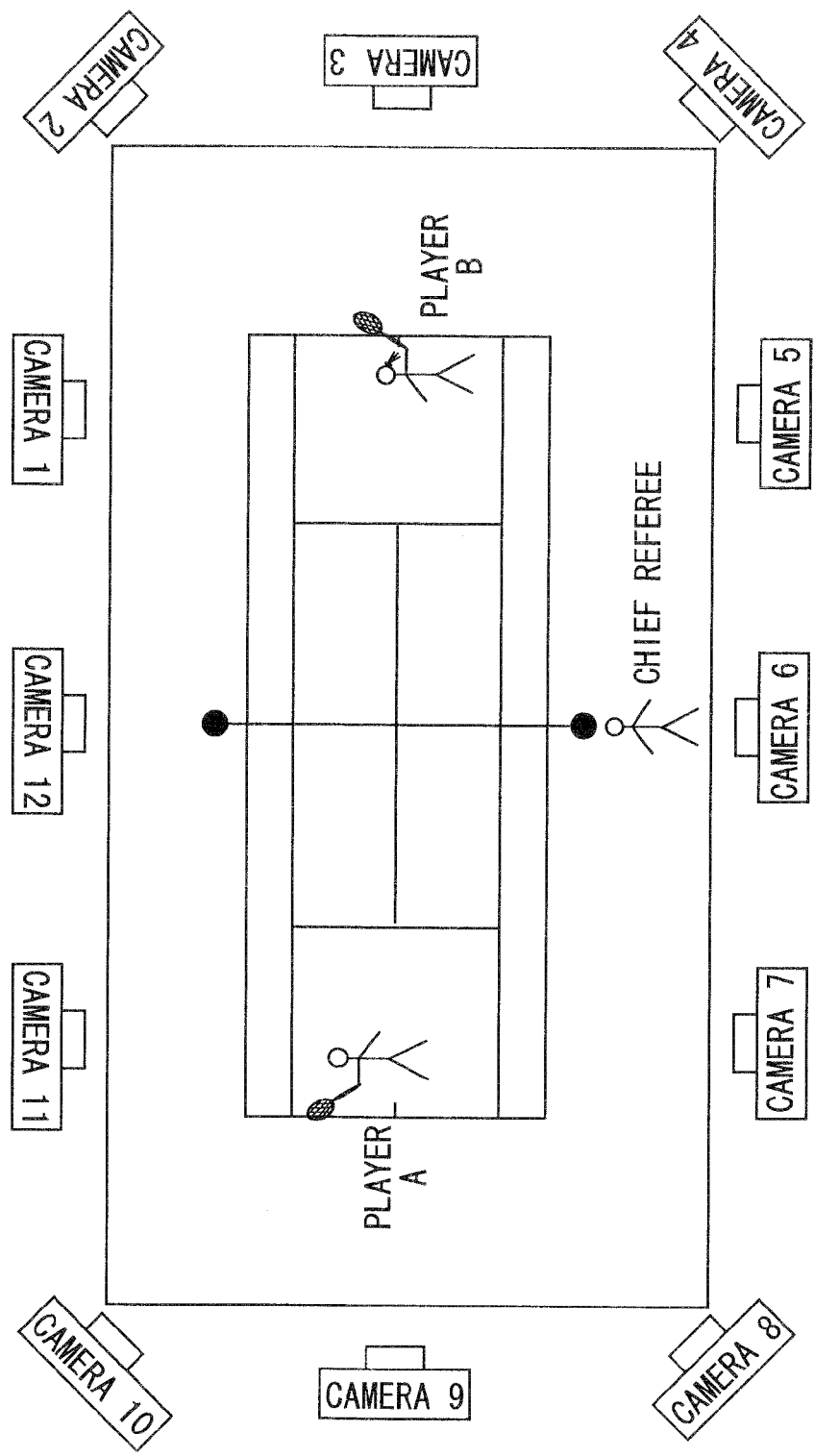
FIG. 2 is a diagram showing taking angles of a tennis match recorded on a DVD.

As shown in FIG. 2, specifically, a tennis match is recorded on the optical disk D. On the optical disk D, twelve angle video data corresponding to twelve angle videos of the tennis match taken at twelve taking angles different from one another are recorded. In the embodiment, each taking angle is fixed. In the description hereinbelow, a video taken with a shown camera n (n=1-12) is referred as an "angle video n", a video data corresponding to each angle video is referred as an "angle video data n", and a video signal corresponding to each angle video data is referred as an "angle video signal n".

Figure 4:
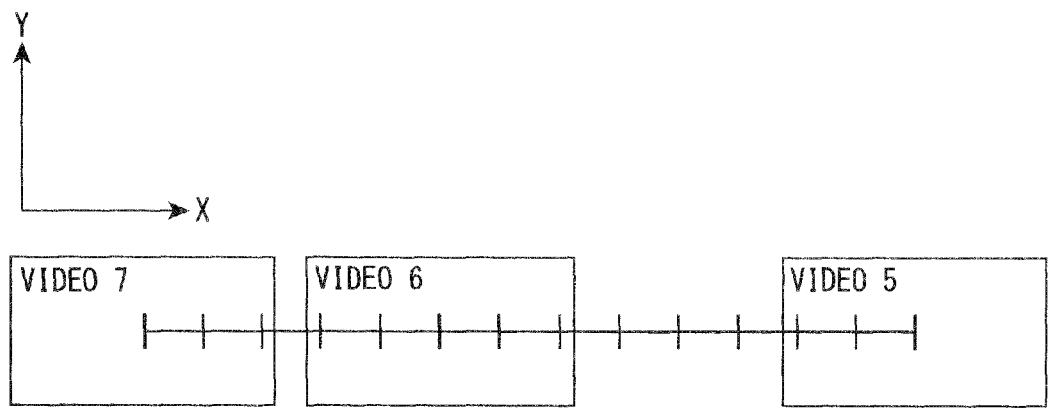
FIG. 4 shows a diagram and tables which express the relative display position by "order" and "distance", respectively.

FIG. 3 shows a relative display position information table. The relative display position information indicates a relative display position of each angle video in consideration of each taking angle. More specifically, the relative display position information indicates display positions of other angle videos with respect to an angle video per the angle video. In this case, the relative display position (x, y) is expressed by "order" This is described with an example of angle videos 5-7. As shown in FIG. 2, the angle video 5 is taken from the chief referee side in which the right player B seen from the chief referee is taken, the angle video 6 is taken from the chief referee side in which the whole court is taken, and an angle video 7 is taken from the chief referee side in which the left player A seen from the chief referee is taken. In this case, to reproduce/display the angle videos 5-7 for the user without a sense of incongruity, with the "player B" of the angle video 5 as a reference, it needs to display a "net" of the angle video 6 at the left side of the angle video 5, and to further display the "player A" of the angle video 7 at the left side of the angle video 6. With the reference of the angle video 5, a display position of the angle video 6 is (−1, 0), and a display position of the angle video 7 is (−2, 0) based on the angle video 5. The relative display position may be expressed by "distance" instead of "order" (see FIG. 4).

FIG. 5 shows a selection order information table. The selection order information indicates which angle video should be reproduced simultaneously in a priority basis among other eleven angle videos regarding each angle video in consideration of each taking angle. This will be explained with an angle video 12. As shown in FIG. 2, the angle video 12 is taken from an opposite side of the chief referee in which the whole court is taken. In this case, to reproduce/display three angle videos for the viewer without a sense of incongruity, the most preferred other two angle videos reproduced with the angle video 12 simultaneously are an angle video 11 taken from the opposite side of the chief referee as same as the angle 12 in which the player A is taken, and an angle video 1 taken from the opposite side of the chief referee in which the player B is taken. The next best preferred videos are an angle video 10 taken from the diagonal opposite side of the chief referee in which the player A is taken, and the angle video 2 taken from the diagonal opposite side of the chief referee in which the player B is taken. The next preferred videos are an angle video 9 taken from the behind of the player A in which the player A is taken, and an angle video 3 taken from the behind or the player B in which the player B is taken. Regarding the angle video 12, the angle videos 1 and 11 are in the first order, the angle videos 2 and 10 are in the second order, and the angle videos 3 and 9 are in the third order. The selection order information is also used for setting an alternative video for an angle video having time discontinuity, details thereof described later.

Figure 6:
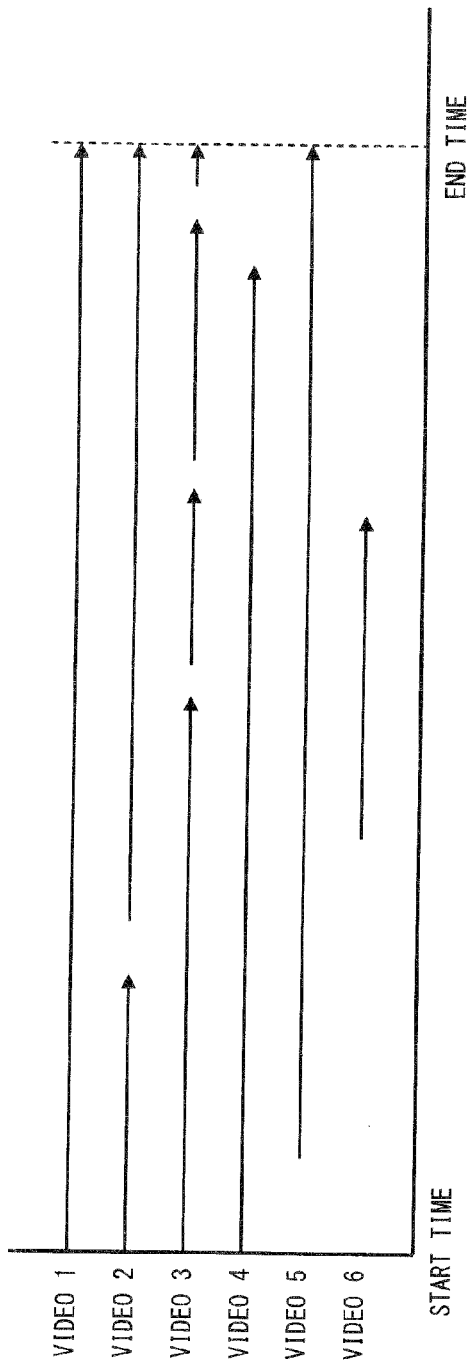
FIG. 6 is a taking time information table.

FIG. 6 shows a taking time information table. The taking time information indicates taking time of each angle video. The taking time may be either relative time or absolute time. In the embodiment, the relative time is used. The taken time information includes taking start time, taking end time, taking interrupt start time, taking interrupt end time (taking restart time) (in FIG. 6, the taken time information of only angle video data 1-6 is shown).

FIG. 7 shows a video type information table. The video type information includes a plurality of video types having different number of picture cells (number of pixels), coding format and necessary data rate (in FIG. 7, the video type information of only angle video data 1-6 is shown) per angle video. More specifically, the plurality of video types are prepared per angle video (for example, three video types, namely, a type 1, a type 2 and a type 3 are prepared for the "video 1"), which are the same videos. Thus, by preparing a plurality of video types, an appropriate type in accordance with the screen resolution of the output monitors 102 or a maximum readout rate can be selected (details thereof will be explained later)

A plurality (three) of sequence files includes a video switching information, overlay information and audio information, respectively. On a course selection screen (not shown), videos by video course can be viewed by selecting three video courses corresponding to the three sequence files. The video course is, for example, such that a video course A is a video focused on the player A, a video course B is a video focused on the player B, and a video course C is a normal video (a video including both players). As described later, it may be possible to acquire the sequence files from a memory unit 119 of the DVD player 101 (see FIG. 11) or a web site and the like. Each information/data stored in each sequence file will be explained hereinbelow.

FIG. 8 shows a video switching information table. In the figure, an "output 1" indicates an output video on the left monitor 102L, an "output 2" indicates an output video on the center monitor 102C, and an "output 3" indicates an output video on the right monitor 102R (see FIG. 1). The video switching information is used for switching sequentially combinations of a plurality of angle videos reproduced simultaneously during reproduction. In this case, the table corresponds to the video course A and the player A is displayed intensively. In a case that the player A plays on the left court seen from the chief referee side at the beginning of taking (the beginning of a match), plays on the right court seen from the chief referee from 10 minutes and 25 seconds, plays on the left court from 21 minutes and 43 seconds, and plays on the right court from 33 minutes and 2 seconds by changing over, the angle video 9 is displayed at the left side, the angle video 8 is displayed at the center, and the angle video 7 is displayed at the right side during a time frame in which the player A plays on the left court. On the other hand, the angle video 5 is displayed at the left side, the angle video 4 is displayed at the center, and the angle video 3 is displayed at the right side during a time frame in which the player A plays on the right court. The video switching information includes information with the relative display position (for example, "left:9, center:8, right:7") in a combination of each angle video but it may be also possible to have only a combination (for example, "7.8.9") and to set the display positions with reference to the above relative display position information.

Figure 10A:
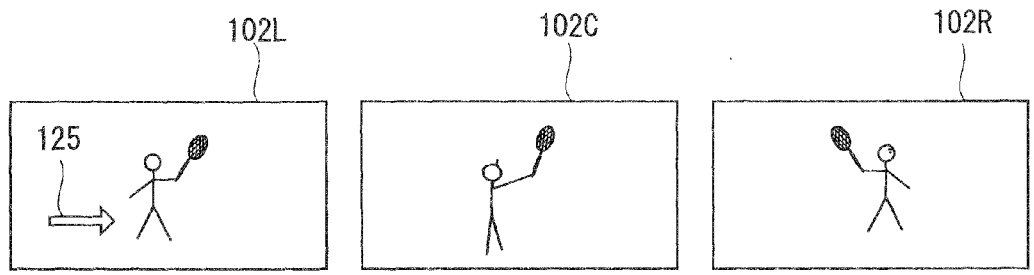
Figure 10B:
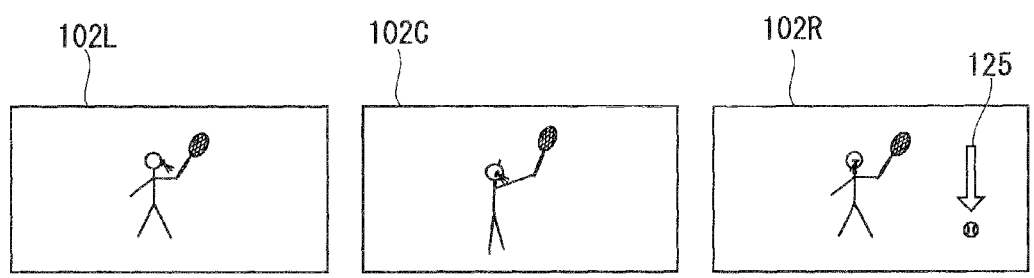
Figure 10C:
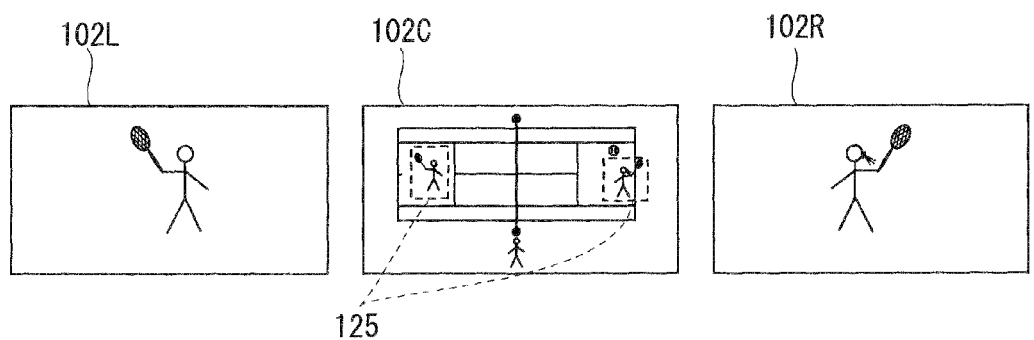

FIG. 9 shows an overlay information table. The overlay information table defines timings and the output monitors 102 to which videos by course are output. Video data by course is recorded with three videos by video course. Each video by course is superimposedly displayed on each angle video (an overlay display), and is a marking 125 indicating each player or motion of a ball. The marking 125 focused on the player A is reproduced when the video course A has been selected (see FIG. 10A), the marking 125 focused on the player B is reproduced when the video course B has been selected (see FIG. 10B), and the marking 125 of both players is reproduced when the video course C has been selected (see FIG. 10C). The marking 125 may be adapted to various display forms such as a marking with a colored specified area rather than an arrow and a surrounding with a dotted line shown in the figure. It may be possible to display text information indicative of content (a "name of the player" and the "ball" or the like) of the marking 125 together with the marking 125 itself.

An audio information table, though not shown, defines a timing for outputting an audio by each course. Audio data by course is recorded with three audios by video course. The audio by each course is reproduced with each angle video, and, for example, is a commentary on the match. A commentary focused on the player A is reproduced when the video course A is selected, a commentary focused on the player B is reproduced when the video course B is selected, and a commentary for both players is reproduced when the video course C is selected.

As shown in FIG. 11, the DVD player 101 functionally includes a data acquiring unit 111, a video signal output unit 112, a arrangement determining unit 113, a type selection unit 114, an audio signal output unit 115, an audio output setting unit 116, a video selection unit 117, a course selection unit 118, the memory unit 119 and a control unit 120. A main function of each unit will be explained hereinbelow and a series of process flows is described later.

The data acquiring unit 111 reads the set optical disk D and acquires various data/information. In terms of the angle video data, three videos selected by the video selection unit 117 are acquired in an integrated form. Also, all (twelve) of the angle video data recorded thereon may be acquired and only three of them may be reproduced. The data acquiring unit 111 acquires various data stored in the memory unit 119, and further acquires information regarding the connected output monitors 102 (the number of monitors, the arrangement thereof and the screen resolution of each output monitors 102).

The video signal output unit 112 are adapted to output three angle video signals to the three output monitors based on the angle video data read out from the optical disk D. In other words, the three angle video data acquired in the integrated form is separated one by one, the separated three angle video data are decoded respectively, a video signal output process is performed on the decoded three angle video data respectively, and finally, the three angle video signals are output. The arrangement determining unit 113 determines the display position arrangement of the three angle videos based on the arrangement information of the output monitors 102 and the relative display position information read out from the optical disk D.

A setting of the output monitors 102 will be explained. The data acquiring unit 111 acquires the arrangement information corresponding to an arrangement in which the three output monitors 102 (the left monitor 102L, the center monitor 102C and the right monitor 102R) are arranged at the left, the center and the right, respectively. When the angle videos 5-7 are selected by the user with the video selection unit 117 described later, the video signal output unit 112 outputs angle video signals 5-7, respectively. The arrangement determining unit 113 determines the display position arrangements of the three angle videos based on the arrangement information of the output monitors 102 and the relative display position information (the angle video 6 as (−1, 0) and the angle video 7 as (−2, 0) with respect to the angle video 5) as reference). Specifically, an output end of the angle video 5 is set to the right monitor 102R, an output end of the angle video 6 is set to the center monitor 102C, and an output end of the angle video 7 is set to the left monitor 102L.

Note that it may be possible to select fewer angle videos than the number of the output monitors 102 by the video selection unit 117. In this case, the arrangement determining unit 113 sets output monitors 102 which do not display angle videos based on the relative display position information of the selected angle video. For example, in a case that the angle video 5 and the angle video 6 are selected by the user, the arrangement determining unit 113 set the left monitor 102L as monitor which does not display the angle video based on the relative display position information. On that basis, the output monitors 102 displaying the angle video 5 and the angle video 6 are set to the right monitor 102R and the center monitor 102C, respectively.

In the embodiment, the three angle videos are displayed on the respective three monitors 102, but it may be possible to display the three angle videos on one output monitors 102 (see FIG. 12). Further, four angle videos may be displayed on two output monitors 102, each of which displays two angle videos. A structure of the DVD player 101 will be explained below, in which three angle videos are displayed on a single output monitor 102.

The video signal output unit 112 separates the three angle video data acquired in the integrated form one by one, decodes the separated three angle video data respectively, performs a synthesizing process on the decoded three angle video data, performs a video signal output process on the synthesized angle video data, and outputs the angle video signals. In this instance, the video signal output unit 112 synthesizes the three angle video signals so as to display the three angle videos on three partitioned display areas 102a in a display screen of one output monitor 102 respectively, based on the display position arrangement determined by the arrangement determining unit 113.

The video signal output unit 112 also outputs the three angle video signals so as to indicate a taking position of partial video of the taken object in a whole video based on the relative display position information when the whole video taken with the whole taken object and the partial video taken with a part of the taken object are included in the twelve angle videos. More specifically, in a case that the angle video 5 (the partial video) in which the player B is taken, the angle video 6 in which the whole tennis court is taken (the whole video) and the angle video 7 (the partial video) in which the player A is taken are reproduced simultaneously, taken position display frames 121 showing respective taking positions of the angle video 5 and the angle video 7 of the taken object are displayed in the angle video 6 based on the relative display position information with the angle video 6 as reference (see FIG. 13). In this case, the relative display position information expressed by "distance" is used.

In the embodiment, each taking angle (taking position) is fixed, but it may be movable. For example, in terms of the angle video 5 and the angle video 7, each taking angle may be movable in accordance with motion of the player B and the player A. In this case, a value (distance) of the relative display position varies with the move of each taking angle. The taken position display frames 121 can be displayed to move in the angle video 6 corresponding to the moving taking position.

Further, the video signal output unit 112 outputs the three angle video signals based on the taking time information. With this, even if a plurality of angle videos has different taking start time with one another, they can be reproduced simultaneously to coincide the taking time or to offset the taking time at a predetermined time. Even if the angle video has time discontinuity during reproduction, the reproduction can be restarted to coincide the taking time with those of other angle videos. Moreover, during the time discontinuity, other angle videos may be reproduced based on the selection order information. More specifically, in a case that the angle video 5 has the time discontinuity, the angle video 6 as the first order in the selection order information of the angle video 5 (see FIG. 5) is output on the same output monitor 102 as alternative video during the time discontinuity.

The type selection unit 114 selects a video type corresponding to the screen resolution of the output monitor 102 on which an angle video is displayed from a plurality of video types of each angle video, based on the video type information read out from the optical disk D and the screen resolution of each of the output monitors 102 acquired by the data acquiring unit 111.

More specifically, the read out video type information is shown in the above FIG. 7, and the screen resolution of each of the output monitors 102 is: the left monitor 102L:HD (1280×720), the center monitor 102C:SD (640×480), the right monitor 102R:full HD (1920×1080). Therefore, the type selection unit 114 selects the video type 2 for the angle video 1, the video type 3 for the angle video 2, and the video type 1 for the angle video 3 when the angle video 1 is output to the left monitor 102L, the angle video 2 is output to the center monitor 102C and the angle video 3 is output to the right monitor 102R.

Further, the type selection unit 114 selects a video type in consideration of the maximum read out rate of the DVD player 101. In other words, in the above case, read out speed of 14+9+18=41 Mbps is needed for reading out the three angle video data. In a case that the maximum read out rate of the DVD player 101 is 38 Mbps, the three angle videos can not be read out in real-time, thereby delays or dropping-frames may happen. To avoid these problems, combination patterns of the video type which are lower than the maximum read out rate are created. For example, a pattern of 14+9+10=33 Mbps as video type 2 is created, in which the angle video 3 is output to the right monitor 102R.

The audio signal output unit 115 outputs a 5.1 CH audio signal to the 5.1 CH speakers 103. The audio output setting unit 116 sets speakers to which an audio signal of each channel is output based on the relative display position information.

The way how to set an audio output will be explained hereinbelow in detail. In a case the user selects the angle videos 5-7, the audio output setting unit 116 sets speakers as an audio signal of each channel is output to such that an audio corresponding to the angle video 5 (the player B) is heard from the right side and an audio corresponding to the angle video 7 (the player A) is heard from the left side based on the display position information (the angle video 6 as (−1, 0) and the angle video 7 as (−2, 0) with the angle video 5 as reference). In other words, sound of hitting a ball by the player A displayed on the left monitor is heard from the left side and sound of hitting the ball by the player B displayed on the right monitor is heard from the right side.

The video selection unit 117 allows the user to select the three angle videos reproduced simultaneously among twelve angle videos corresponding to the recorded twelve angle video data on a video selection screen 122 (see FIG. 14A) displayed in either one of the output monitors 102 (for example, the center monitor 102C). Further, the video selection unit 117 displays candidate videos of the remained angle videos on the video selection screen 122 based on the selection order information of each selected angle video when one of the three angle videos is selected by the user.

Figure 14A:
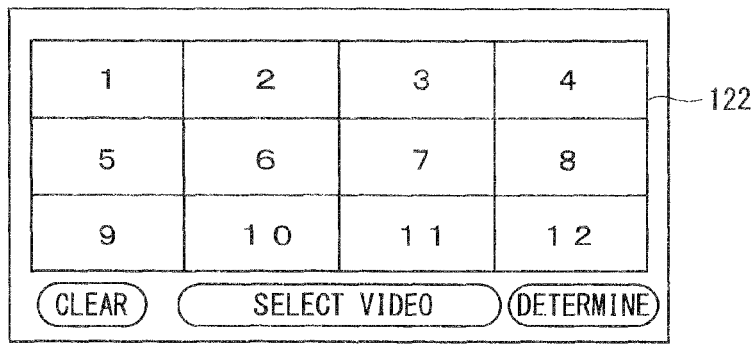
FIGS. 14A to 14D show selection examples on a video selection screen.
Figure 14B:
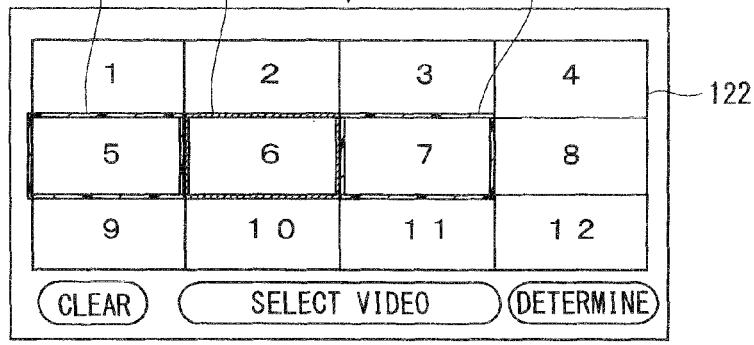

More specifically, the video selection unit 117 displays images for selection of twelve angle videos in a matrix (three verticals×four horizontals) alignment simultaneously on the video selection screen 122 (see FIG. 14A). Each image for selection is a number in figures, but in practice, is a still image or a digest video of each angle video. In a case that the angle video 6 is selected as first angle video among twelve angle videos (images for selection) by the user, the angle video 6 is surrounded by a red-colored already-selection display frame 123 to display as already selected. At the same time, the angle video 5 and the angle video 7 are selected as candidate video based on the selection order information of the angle video 6 (see FIG. 5) and are surrounded by yellow-colored candidate display frames 124 to display on the video selection screen 122 (see FIG. 14B). Therefore, preferred videos reproduced simultaneously with the angle video 6 in which the overall court is taken from the chief referee, namely, the angle video 7 in which the player A is taken from the chief referee side and the angle video 5 in which the player B is taken from the chief referee side are displayed as candidate video.

Figure 14C:
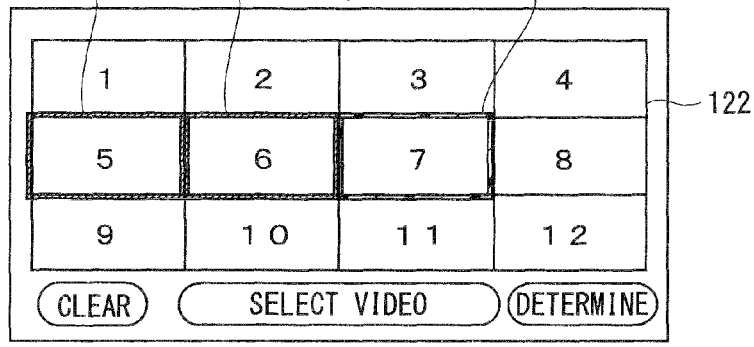
Figure 14D:
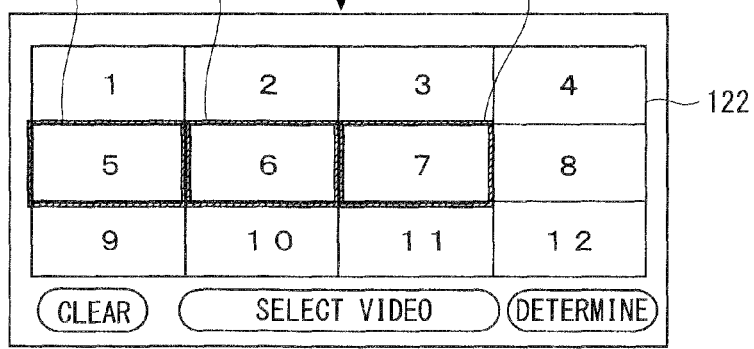

Next, when the angle video 5 is selected as second angle video by the user, the angle video 5 is surrounded and displayed with the already-selection display frame 123. At the same time, the angle video 7 is selected as candidate video based on the selection order information of the angle videos 5 and 6 and is surrounded by the candidate display frame 124 to display on the video selection screen 122 (see FIG. 14C). Therefore, the preferred angle video 7 reproduced simultaneously with the angle videos 5 and 6 is displayed as candidate video. When the angle video 7 is selected as third angle video by the user, the angle video 7 is surrounded and displayed with the already-selection display frame 123 (see FIG. 14D). An instruction for determining an angle video is made (a confirmation button is depressed) by the user, a video selection process is terminated.

The video selection unit 117 may further display the second order candidate (for example, with a blue frame) and the third order candidate (for example, with a green frame). In a case that angle videos other than angle videos displayed as candidate video are selected by the user, the video selection unit 117 is to receive those videos. When the user does not wish to display the three angle videos it is possible to select one or two of these video angles.

The course selection unit 118 allows the user to select one video course from the above plurality of video courses on a course selection screen displayed in either one of the output monitors 102 (for example, the center monitor 102C). The video signal output unit 112 outputs the three angle video signals based on a sequence file corresponding to the video course selected by the course selection unit 118. The arrangement determining unit 113 determines the display positions of the three angle videos based on a sequence file corresponding to the video course selected by the course selection unit 118 per combination of the three angle videos switched sequentially.

More specifically, when the video course A is selected on the course selection screen by the user, the angle video 9 is displayed on the left monitor 102L, the angle video 8 is displayed on the center monitor 102c, and the angle video 7 is displayed on the right monitor 102R on starting of reproduction based on the sequence file of the video course A (the video switching information, see FIG. 8). At the time of 10 minutes and 25 seconds, the combinations of the three angle videos are switched, and the angle video 5 is displayed on the left monitor 102L, the angle video 4 is displayed on the center monitor 102C and the angle video 3 is displayed on the right monitor 102R. In a similar fashion, reproduction is performed by switching combinations of the three angle videos subsequently.

The memory unit 119 is, for example, composed of a hard disk and stores a sequence file newly created by the user as mentioned above. It also may be possible to store the angle video data and the like stored in the optical disk D in the memory unit 119. The control unit is, for example, composed of a CPU. The control unit performs various calculating processes, judging processes and selection processes by user's selection, and controls the DVD player 101 as a whole.

The video display system 100 thus structured is capable of executing normal reproducing process and a sequence reproducing process. The user can select which reproducing process should be performed on a reproducing process selection screen (not shown) in the output monitor 102. Each reproducing process will be explained hereinbelow.

Figure 15:
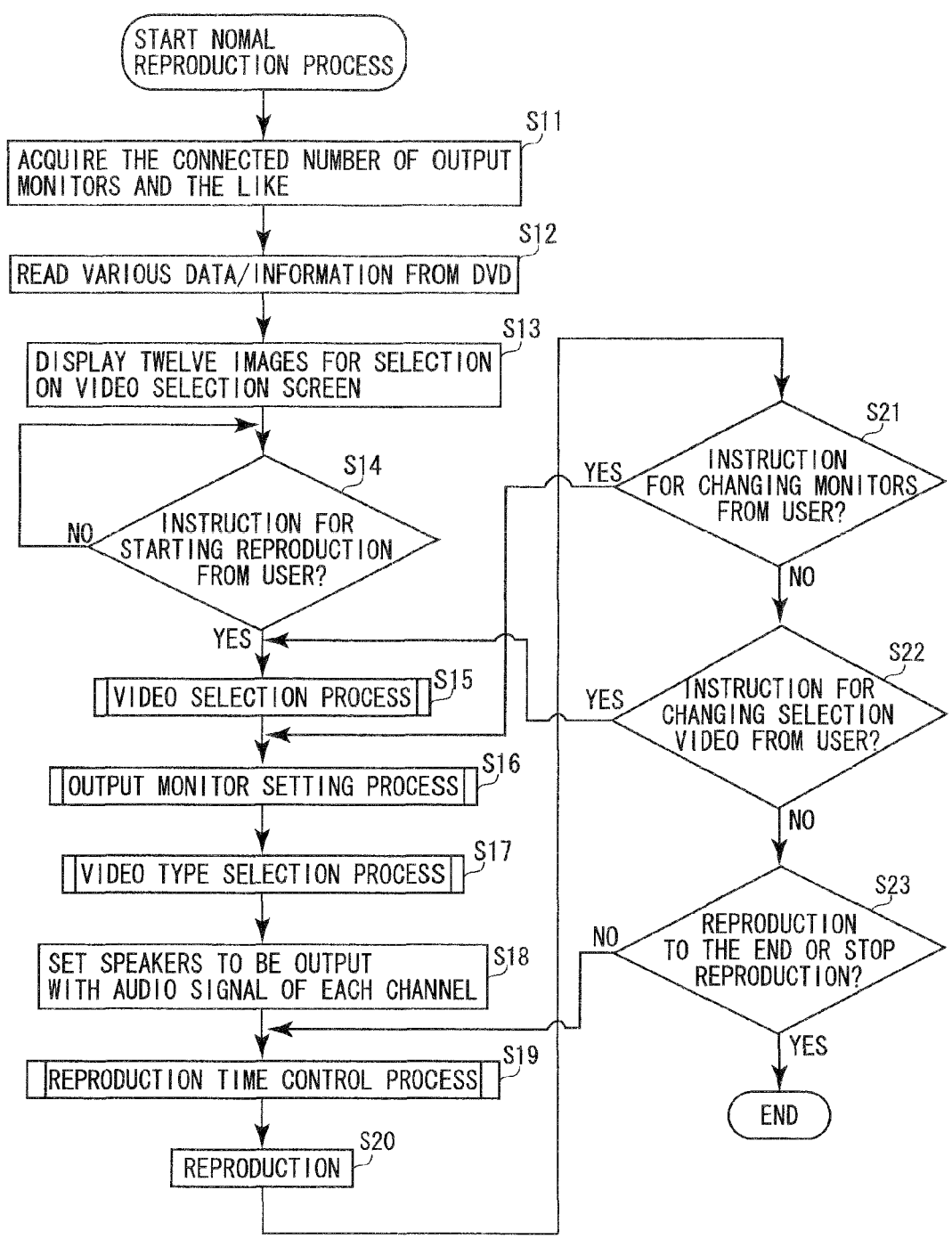
FIG. 15 is a flow chart explaining a normal reproducing process.

A series of processes regarding the normal reproducing process of the video display system 100 will be explained referring to a flow chart shown in FIG. 15. First of all, the data acquiring unit 111 acquires the number, the arrangement and the screen resolution of the connected output monitors 102 (S11). The data acquiring unit 111 also read out a plurality of angle video data and various data/information of the relative display position information and the like, from the set optical disk D (S12). Next, the video selection unit 117 displays twelve images for selection on the video selection screen 122 displayed in, the output monitor 102 (S13).

As the control unit 120 receives an instruction for start of reproduction from the user (S14: Yes) the video selection process (S15), an output monitor setting process (S16) and a video type selection process (S17) described later are performed respectively. The audio output setting unit 116 set speakers to which an audio signal of each channel is output based on the relative display position information (S18). Then, after performing a reproducing time control process described later (S19), the three angle videos are reproduced simultaneously in the arrangement of determined display positions (S20).

During reproduction, when the control unit 120 receives an instruction for changing the output monitors 102 from the user (S21: Yes), processes of the output monitor setting process (S16) and the processes thereafter are performed. When an instruction for changing selection videos from the user is received (S22: Yes), processes of the video selection process (S15) and the processes thereafter are performed again. Finally, reproducing the angle videos is performed to the end or the control unit 120 receives an instruction from the user by which reproduction stops, the series of processes ends.

A series of processes regarding the video selection process (S15) will be explained with reference to a flow chart shown in FIG. 16. The video selection unit 117 prompts the user to select three images (angle videos) for selection on the video selection screen 122 (S31). In a case that the number of selected videos are fewer than the number of acquired output monitors 102 (S32: Yes) the video selection unit 117 selects angle videos as candidate video based on the selection order information (S33). Then, the control unit 120 displays the selected angle videos as candidate video on the video selection screen 122 (S34). After determining instruction for the three angle videos by the user (S35: Yes) the video selection unit 117 determines the three angle videos as three angle videos which are reproduced simultaneously (S36).

Figure 17:
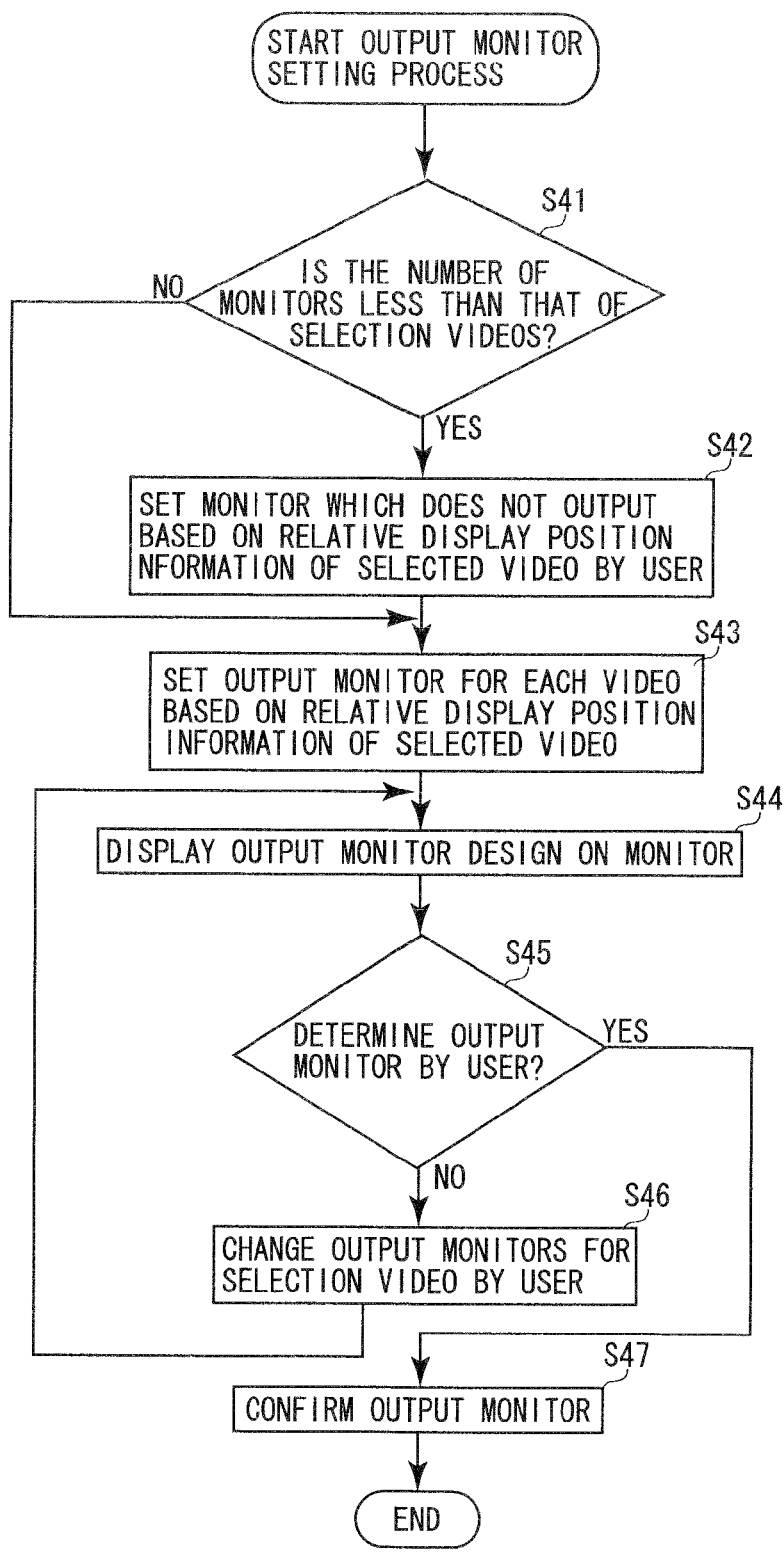
FIG. 17 is a flow chart explaining a monitor setting process.

A series of processes regarding the output monitor setting process (S16) will be explained with reference to a flow chart shown in FIG. 17. The control unit 120 determines whether the number of selected videos are fewer than the number of output monitors 102. In a case that the control unit 120 judges as the number of selected videos are fewer than the number of output monitors 102 (S41: Yes), the arrangement determining unit 113 sets output monitors 102 which do not display an angle video (S42). Moreover, the arrangement determining unit 113 sets output monitors 102 which display each angle video based on the relative position information of each of the selected angle videos (S43). Subsequently, the control unit 120 displays a setting result (an output monitor design) of the output monitors 102 on the output monitors 102 (S44). In a case that an instruction for changing output monitors 102 is made by the user (S45: No), the arrangement determining unit 113 changes the output monitors 102 which display each angle video based on the user's instruction (S46), and the control unit 120 again displays another output monitor design. On the other hand, an instruction for determining the output monitors 102 by the user (S45: Yes), the arrangement determining unit 113 confirms the output monitors 102 which display each angle video (S46).

Figure 18:
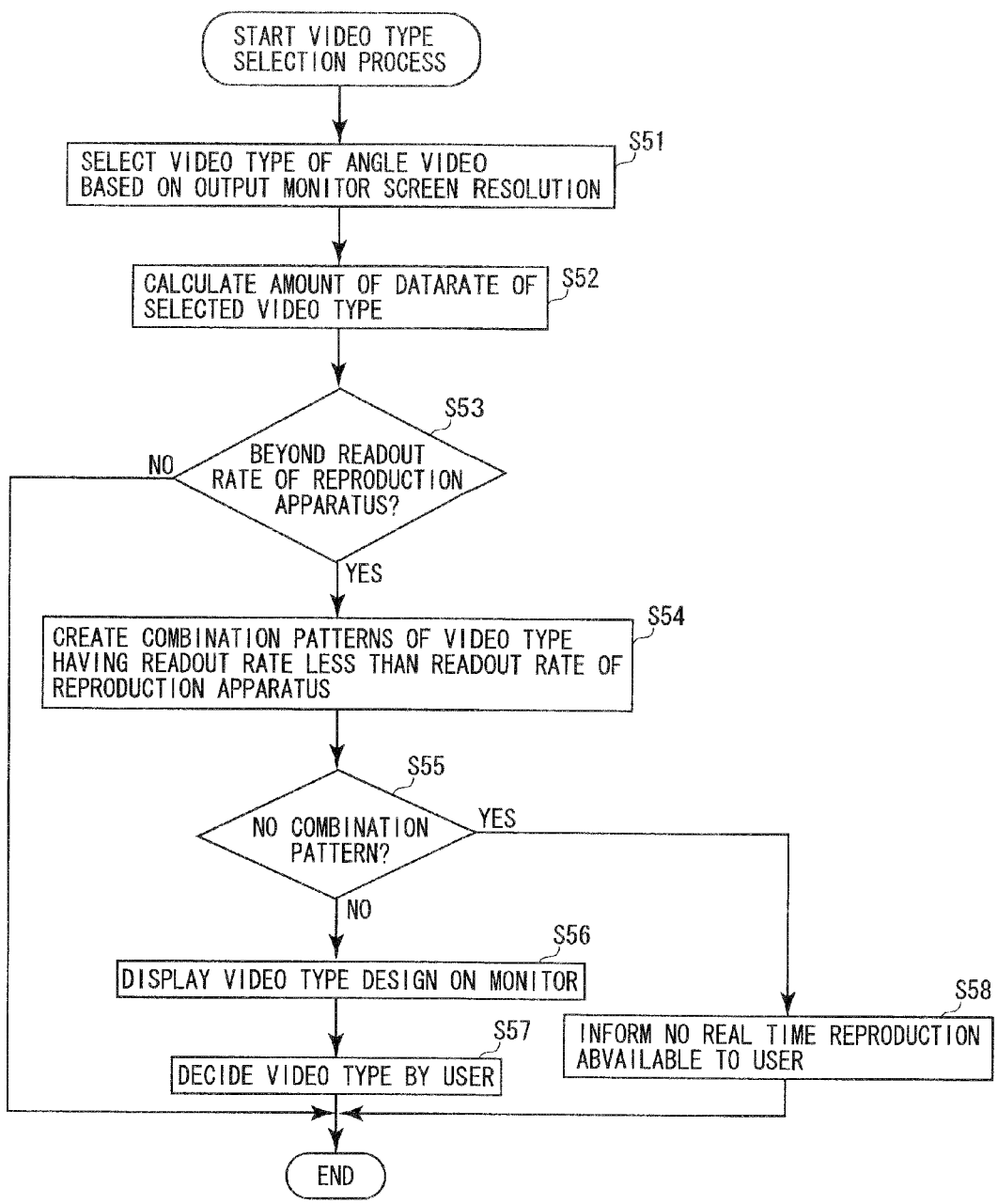
FIG. 18 is a flow chart explaining a video type selection process.

A series of processes regarding the video type selection process (S17) will be explained with reference to a flow chart shown in FIG. 18. The type selection unit 114 selects a video type of an angle video based on screen resolution of the output monitors 102 which display each angle video (S51). The control unit 120 calculates the amount of data rate of the selected video type (S52) and judges whether the amount is beyond the maximum readout rate of the DVD player 101. In a case that the control unit 120 judges that the amount is not beyond the maximum readout rate (S53: No), the processes end. On the other hand, in a case that the control unit 120 judges that the amount is beyond the maximum readout rate (S53: Yes), the type selection unit 114 creates combination patterns of video type which are less than the maximum readout rate of the DVD player 101 (S54). When there is a combination pattern adapted to the above condition exists (S55: No), the control unit 120 displays the combination (the video type design) on the output monitors 102 (S56). Then the user instructs to determine the video type (S57). Unless such a combination pattern is exists (S55: Yes), the control unit 120 guides (displays on the output monitors 102) that a real time reproduction is not available (S58).

Figure 19:
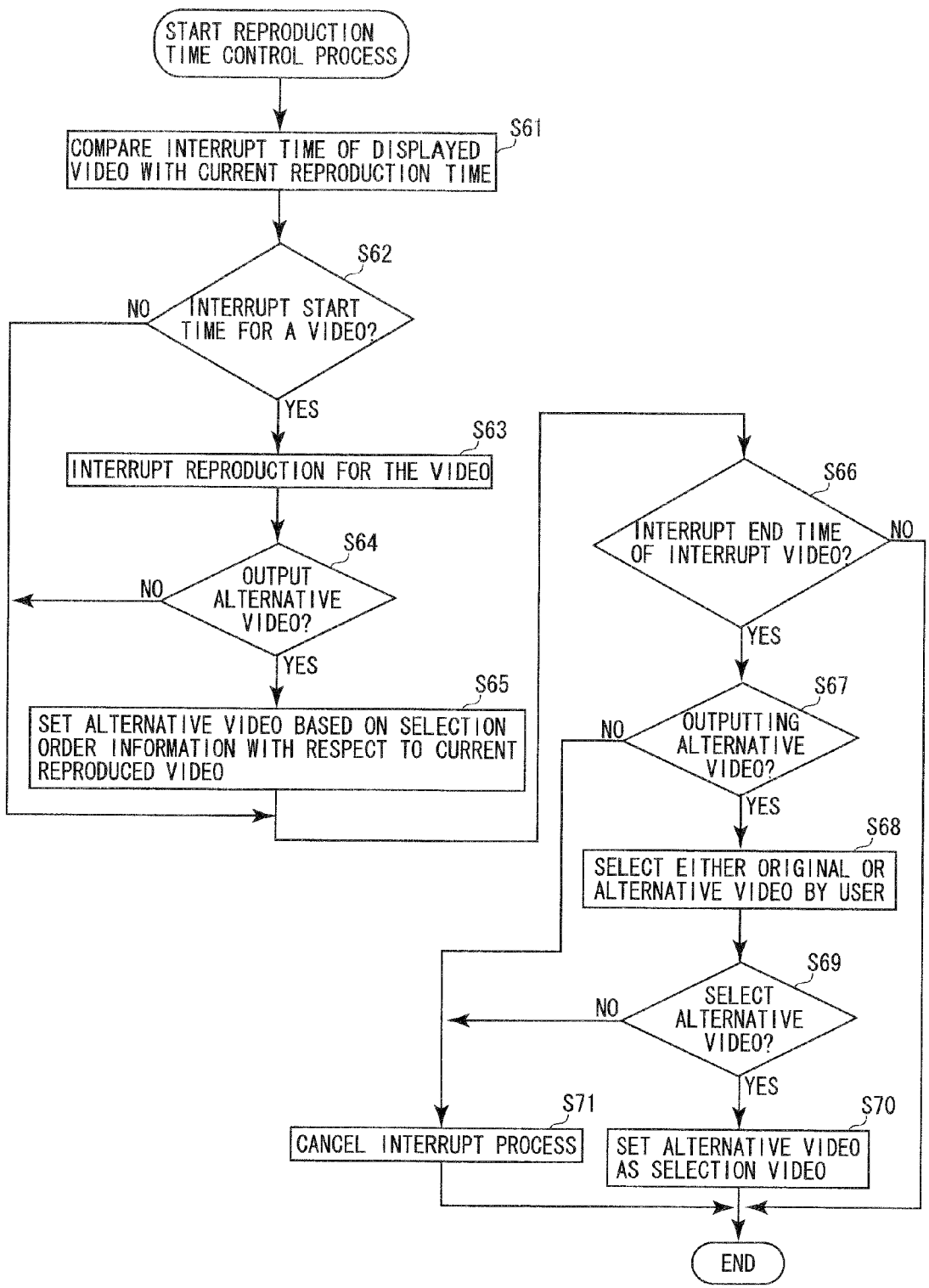
FIG. 19 is a flow chart explaining a reproducing time control process.

A series of processes regarding the reproducing time control process (S19) will be explained with reference to a flow chart shown in FIG. 19. The control unit 120 compares interrupt time of the displayed angle video with the current reproducing time (S61) and judges whether the angle video proceeds to interrupt start time. When it is judged that the interrupt start time comes (S62: Yes), the video signal output unit 112 interrupts reproduction (output of the angle video signal) of the angle video (S63). The control unit 120 also judges whether an alternative video should be output based on user's selection (S64). When it is judged that the alternative video should be output (S64: Yes), the control unit 120 sets an alternative video based on the selection order information with reference to the current reproducing angle video as reference (S65), and the video signal output unit 112 reproduces the alternative video.

Subsequently, the control unit 120 judges whether interrupt end time of an interrupt video comes. In a case that it is judged that the interrupt end time comes (S66: Yes), it is also judged whether the alternative video is on output. When the alternative video is output (S67: Yes), the user selects either the original angle video or the alternative video to be output (S68). When the control unit 120 receives a selection for the alternative video (S69: Yes), the alternative video is set as angle video (S70). On the other hand, a selection for the original angle video is received (S69: No), the video signal output unit 112 cancels the interrupt process (stops reproducing the alternative video), and reproduce the original angle video (S71).

Figure 20:
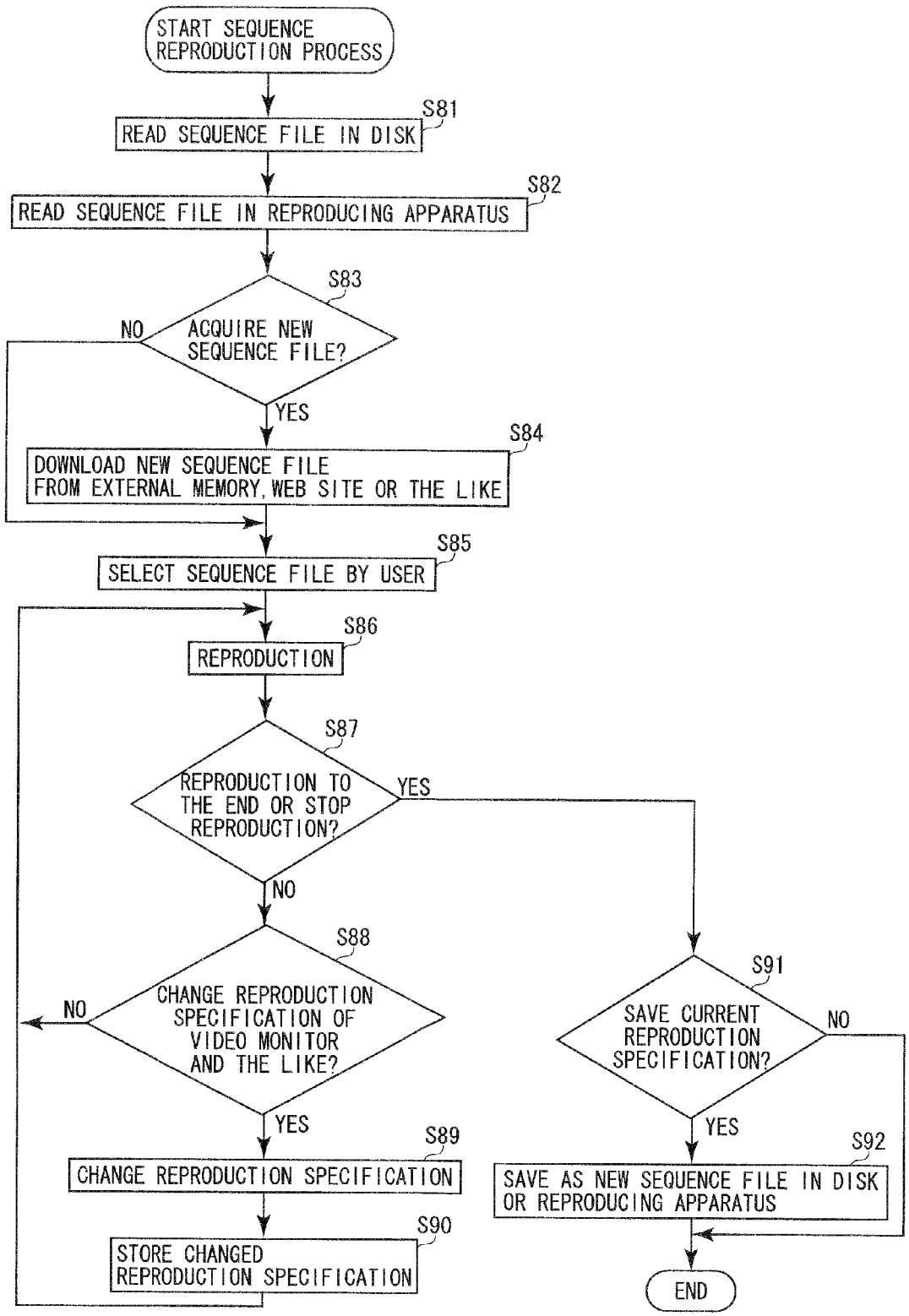
FIG. 20 is a flow chart explaining a sequence reproducing process.

A series of processes regarding the sequence reproducing process will be explained with reference to a flow chart shown in FIG. 20. The data acquiring unit 111 reads out a sequence file recorded on the optical disk D (S81) and acquires a sequence file stored in the memory unit 119 (S82). Then, the control unit 120 judges whether a newly sequence file should be acquired based on user's selection. If it is acquired (S83: Yes), the data acquiring unit 111 downloads the newly sequence file from an external memory, a web site, or the like (S84).

The course selection unit 118 sets a sequence file to be executed from a plurality of sequence files to be thus acquired based on user's selection (S85). The video signal output unit 112 reproduces while switching sequentially combinations of the three angle videos to be reproduced simultaneously based on the set sequence file (S86). At this time, the above mentioned video by course (the overlay display) and the audio by course are also reproduced.

Prior to reproducing the angle video to the end or to receiving the instruction for stopping reproduction from the user (S87: No), when the control unit 120 receives an instruction by which the combination of the angle videos or the reproducing specification is changed from the user (S88: Yes), each unit changes the reproducing specification (S89), the memory unit 119 stores the changed reproducing specification (S90), and the control unit 120 continues to reproduce (S86).

After the angle video is reproduced to the end or the instruction by which reproduction is stopped is received from the user (S87: Yes), the control unit 120 judges whether the current reproducing specification should be stored based on user's selection. When it is judged that it needs to be stored (S91: Yes), the current reproducing specification is written on the optical disk D or is stored in the memory unit 119 (S92).

As described above, according to the video display system 100 of the embodiment, it is possible to display a plurality of angle videos reproduced simultaneously so as to be reproduced with a display position arrangement in consideration of a taking angle of each angle video. In the embodiment, though a plurality of angle video data and various data/information are recorded on the optical disk D, it is possible to use other recording media such as the memory unit 119 of the DVD player 101. It is also possible to use a set top box to accumulate videos transmitted by VOD or the like in a memory.

The invention claimed is:

1. A video reproducing apparatus comprising:
    a data acquiring unit which acquires a plurality of angle video data which is equal or less than an amount of the angle video data, relative display position information corresponding to the angle video data, audio data, and selection order information from a recording unit which records the plurality of angle video data corresponding to a plurality of angle videos taken at a plurality of taking angles different from one another at which a taken object is taken and having relativity with one another, which records the relative display position information indicating a relative display position of each angle video in consideration of each taking angle, which records the audio data corresponding to audios of a plurality of channels reproduced with the plurality of angle videos, and which records the selection order information indicating which angle video should be reproduced simultaneously on a priority basis among the other plurality of angle videos for each of the angle videos in consideration of each taking angle, the priority basis indicating a proximity closeness value of each angle video;
    a video signal output unit which outputs a plurality of angle video signals corresponding to the plurality of angle videos on a display unit, having a plurality of display devices surrounding a central display device, based on the plurality of angle video data;
    an arrangement determining unit which determines display position arrangement of the plurality of angle videos based on the relative display position information;
    an audio signal output unit which outputs audio signals of the plurality of channels to speakers having a plurality of channels based on the audio data; and
    an audio output setting unit which sets the speakers to be output with the audio signal of each channel based on the relative display position information,
    the video signal output unit respectively outputting
    i) a reference angle video on the central display device, the reference angle video being taken from a reference location, and
    ii) plural other angle videos on the plural display devices surrounding the central display device, each of the plural other angle videos being displayed based on the priority basis as determined by the proximity closeness value of each angle video from the selection order information.

2. The video reproducing apparatus according to claim 1, in a case that the display unit is composed of a plurality of display apparatuses, the video signal output unit outputs the plurality of angle video signals to the plurality of display apparatuses separately, and the arrangement determining unit sets the display apparatuses to which each angle video signal is output based on arrangement information of the plurality of display apparatuses and the relative display position information.

3. The video reproducing apparatus according to claim 2, wherein the recording unit records video type information composed of a plurality of video types having the different number of pixels per angle video, the data acquiring unit acquires the video type information, the video reproducing apparatus further comprising a video type selection unit which selects a video type corresponding to screen resolution of the display unit on which the angle video is displayed from the plurality of video types of each of the angle videos based on the video type information.

4. The video reproducing apparatus according to claim 1, in a case that only one display unit is provided, the video signal output unit synthesizes the plurality of angle video signals to output to the display unit on which the plurality of angle videos are displayed on a divided plurality of display areas respectively in a screen display of the display unit based on the determined video display position arrangement.

5. The video reproducing apparatus according to claim 1, wherein the plurality of angle videos includes a whole video in which the taken object is taken as a whole and a partial video in which a part of the taken object is taken, the video signal output unit outputs the plurality of angle video signals so as to indicate a taking spot for the partial video of the taken object in the whole video based on the relative display position information.

6. The video reproducing apparatus according to claim 1, wherein the recording unit records taking time information indicating taking time of each of the angle videos, the data acquiring unit acquires the taking time information from the recording unit, and the video signal output unit outputs the plurality of angle video signals based on the taking time information.

7. A video displaying system comprising the video reproducing apparatus as set forth in claim 1 and the displaying unit.

8. A video reproducing apparatus comprising:
    a data acquiring unit which acquires a plurality of angle video data which is equal or less than an amount of the angle video data, relative display position information corresponding to the angle video data, and selection order information from a recording unit which records the plurality of angle video data corresponding to a plurality of angle videos taken at a plurality of taking angles at which a taken object is taken from different angles one another and having relativity with one another, which records the relative display position information indicating a relative display position of each angle video in consideration of each taking angle, which records the selection order information indicating which angle video among other plurality of angle videos should be reproduced simultaneously on a priority basis for each angle video in consideration of each taking angle, the priority basis indicating a proximity closeness value of each angle video;

a video selection unit which allows a user to select the plurality of angle videos reproduced simultaneously among the plurality of angle videos on a selection screen;

a video signal output unit which outputs a plurality of angle video signals corresponding to the selected plurality of angle videos to a display unit having a plurality of display devices surrounding a central display device; and an arrangement determining unit which determines display position arrangement of the plurality of angle videos based on the relative display position information;

wherein the video selection unit displays a candidate video of a remaining angle video based on the selection order information of each of the selected angle videos when the user selects a part of the plurality of angle videos, the video signal output unit respectively outputting i) a reference angle video on the central display device, the reference angle video being taken from a reference location, and ii) plural other angle videos on the plural display devices surrounding the central display device, each of the plural other angle videos being displayed based on the priority basis as determined by the proximity closeness value of each angle video from the selection order information.

9. A video reproducing apparatus comprising:

a data acquiring unit which acquires a plurality of angle video data which is equal or less than an amount of the angle video data, relative display position information corresponding to the angle video data, and a sequence file with selection order information from a recording unit which records the plurality of angle video data corresponding to a plurality of angle videos taken at a plurality of taking angles at which a taken object is taken from different angles one another and having relativity with one another, which records the relative display position information indicating a relative display position of each angle video in consideration of each taking angle, and which records the sequence file by which combinations of the plurality of angle videos reproduced simultaneously are switched sequentially during reproduction, and which further records the selection order information indicating which angle video should be reproduced simultaneously on a priority basis among the other plurality of angle videos for each of the angle videos in consideration of each taking angle, the priority basis indicating a proximity closeness value of each angle video;

a video signal output unit which outputs a plurality of angle video signals corresponding to the plurality of angle videos to a display unit, having a plurality of display devices surrounding a central display device, based on the plurality of angle video data and the sequence file; and an arrangement determining unit which determines display position arrangement of the plurality of angle videos per combination of the plurality of angle videos switched sequentially based on the relative display position information and the sequence file, the video signal output unit respectively outputting i) a reference angle video on the central display device, the reference angle video being taken from a reference location, and ii) plural other angle videos on the plural display devices surrounding the central display device, each of the plural other angle videos being displayed based on the priority basis as determined by the proximity closeness value of each angle video from the selection order information.

10. The video reproducing apparatus according to claim 9, wherein the recording unit records a plurality of sequence files, and the video reproducing apparatus further comprising a course selection unit which allows a user to select a video course among a plurality of video courses corresponding to the respective sequence files on the selection screen.

11. The video reproducing apparatus according to claim 10, wherein each of the sequence files includes a video data by course per video course, and the video signal output unit outputs the plurality of angle video signals so as to display the video by course based on the video data by course to superimpose on each angle video.

12. The video reproducing apparatus according to claim 10, wherein each of the sequence files includes audio data by course per video course, and the video reproducing apparatus further comprising an audio signal output unit which outputs an audio signal by course to speakers based on the audio data by course.

* * * * *